(12) United States Patent
Papanikolopoulos et al.

(10) Patent No.: US 8,342,440 B2
(45) Date of Patent: Jan. 1, 2013

(54) MINIATURE ROBOTIC VEHICLE WITH GROUND AND FLIGHT CAPABILITY

(75) Inventors: Nikolaos P. Papanikolopoulos, Minneapolis, MN (US); Alex J. Kossett, Vadnais Heights, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 240 days.

(21) Appl. No.: 12/962,310

(22) Filed: Dec. 7, 2010

(65) Prior Publication Data

US 2011/0139923 A1 Jun. 16, 2011

Related U.S. Application Data

(60) Provisional application No. 61/285,240, filed on Dec. 10, 2009.

(51) Int. Cl.
*B64C 37/00* (2006.01)
*B64C 29/00* (2006.01)
*B64C 27/10* (2006.01)
*B64C 25/04* (2006.01)
*A63H 27/133* (2006.01)

(52) U.S. Cl. ....... 244/2; 244/7 B; 244/17.11; 244/17.17; 244/17.23; 244/23 B; 446/36; 446/37

(58) Field of Classification Search .................. 244/7 A, 244/7 B, 7 R, 12.2, 12.4, 17.11, 17.23, 23 B, 244/23 C, 27.27; 446/36, 37
See application file for complete search history.

(56) References Cited

U.S. PATENT DOCUMENTS

| | | | |
|---|---|---|---|
| 3,096,046 | A | 7/1963 | Kendall, Jr. et al. |
| 4,173,321 | A | 11/1979 | Eickmann |
| 5,505,407 | A | 4/1996 | Chiappetta |
| 6,340,133 | B1 | 1/2002 | Capanna |
| 6,548,982 | B1 | 4/2003 | Papanikolopoulos et al. |
| 6,588,701 | B2 | 7/2003 | Yavnai |
| 6,860,346 | B2 | 3/2005 | Burt et al. |
| 7,510,142 | B2 | 3/2009 | Johnson |
| 7,559,385 | B1 | 7/2009 | Burt et al. |

OTHER PUBLICATIONS

Etienne, Martin, "AVSIM Commercial Aircraft Review: Aerosoft/DIgital Aviation—Piper PA31T Cheyenne X", Feb. 26, 2008, AVSIM Online, <http://www.avsim.com/pages/0208/CheyenneX/CheyenneX.htm>.*

"Bell Boeing V-22 Osprey", Oct. 1, 2012, Wikipedia, <http://en.wikipedia.org/wiki/Bell_Boeing_V-22_Osprey>.*

Boria et al., "A Sensor Platform Capable of Aerial and Terrestrial Locomotion" *IEEE IRS/RSJ Intl. Conf. on Intelligent Robots and Systems*, Aug. 2-6, 2005. Edmont, Alberta Canada. 7 pages total.

Georgiades et al., "Aqua: an aquatic walking robot" *Proceedings of 2004 IEEE RSJ Intl. Conference on Intelligent Robots and Systems*, Sep. 28-Oct. 2, 2004; Sendai, Japan. pp. 3525-3531.

(Continued)

*Primary Examiner* — Tien Dinh
*Assistant Examiner* — Michael Wang
(74) *Attorney, Agent, or Firm* — Mueting Raasch & Gebhardt, P.A.

(57) ABSTRACT

Miniature robotic vehicles suitable for a variety of tasks including covert surveillance, reconnaissance, and recreation are provided. Embodiments of the invention may include vehicles having a hybrid transportation system that incorporates a rotary-wing flight mode in conjunction with a wheeled ground transport mode. As a result, exemplary vehicles provide efficient ground-mode travel, with the added ability to fly over large obstacles and rough terrain.

21 Claims, 29 Drawing Sheets

OTHER PUBLICATIONS

Herbert et al., "Loper: A quadruped-hybrid stair climbing robot" *2008 IEEE International Conference on Robotics and Automation (ICRA 2008)*. Pasadena, CA, USA. May 19-23, 2008. pp. 799-804.

Kossett et al., "Design of an Improved Land/Air Miniature Robot" *2010 IEEE Intl. Conference on Robotics and Automation*, May 3-8, 2010, Anchorage, AK, USA: pp. 632-637.

Kossett et al., "More Than Meets the Eye: A Hybrid-Locomotion Robot with Rotary Flight and Wheel Modes" *2009 IEEE/RSJ International Conference on Intelligent Robots and Systems*, Oct. 11-15, 2009, St. Louis, MO, USA: pp. 5653-5658.

Kossett et al. "A Robust Miniature Robot Design for Land/Air Hybrid Locomotion," *2011 IEEE International Conference on Robotics and Automation*, Shanghai International Conference Center, May 9-13, 2011, Shanghai, China. pp. 4595-4600.

Kovac et al., "A miniature 7g jumping robot" *IEEE International Conference on Robotics and Automation*, Pasadena, CA, USA. May 19-23, 2008. pp. 373-378.

Lambrecht et al., "A small, insect-inspired robot that runs and jumps" *Proceedings of the 2005 IEEE Int. Conference on Robotics and Automation*. Barcelona, Spain. Apr. 2005: pp. 1240-1245.

Mettler et al., "A first investigation into the teleoperation of a miniature rotorcraft" O. Khatib et al. (Eds.): *Experimental Robotics: The 11th Intern. Sympo., STAR 54*, pp. 191-199. Springerlink.com. Springer-Verlag Berlin Heidelberg 2009. Title Page, Copyright Page, Table of Contents, and pp. 191-199.

Michelson. "Entomopter Project" *Angel-Strike* [online]. Retrieved from the Internet on Jun. 9, 2011, URL:<http://angel-strike.com/entomopter/EntomopterProjectbody.html>. 4 pgs.

Michelson et al., "Update on flapping wing micro air vehicle research: Ongoing work to develop a flapping wing, crawling 'entomopter'" *13th Bristol International RPV Conference*, Bristol England, Mar. 30-Apr. 1, 1998. 11 pages.

"Morphing Micro Air and Land Vehicle: MMALV Series Robots" *Case Western Reserve University* [online]. Retrieved from the Internet Dec. 1, 2010, URL:<http://biorobots.cwru.edu/projects/mmalvweb/>. 2 pages.

Mourikis et al., "Autonomous stair climbing for tracked vehicles" *International Journal of Robotics Research*, Jul. 2007; 26(7): 737-758.

Papanikolopoulos, Nikolaos "Algorithms and Software/Hardware Infrastructure for Distributed Miniature Robots". Grant Abstract, Grant No. IIP-0726109 [online]. National Science Foundation. Project Start Date: May 15, 2007 [retrieved on Jun. 7, 2011]. Retrieved from the Internet: <URL: http://www.nsf.gov/awardsearch/showAward.do?AwardNumber=0726109>. 3 pages.

Saranli et al., "RHex: A simple and highly mobile hexapod robot" *International Journal of Robotics Research*, Jul. 2001; 20(7): 616-631.

Stoeter et al., "Autonomous stair-hopping with scout robots" *In Proc. of the IEEE/RSJ International Conference on Intelligent Robots and Systems*, EPFL, Lausanne, Switzerland. Oct. 2002. pp. 721-726.

Yang et al., "Preliminary development of a biomimetic amphibious robot capable of multi-mode motion" *Proceedings of the 2007 IEEE Intl. Conference on Robotics and Biomimetics*, Dec. 15-18, 2007, Sanya, China. pp. 769-774.

* cited by examiner

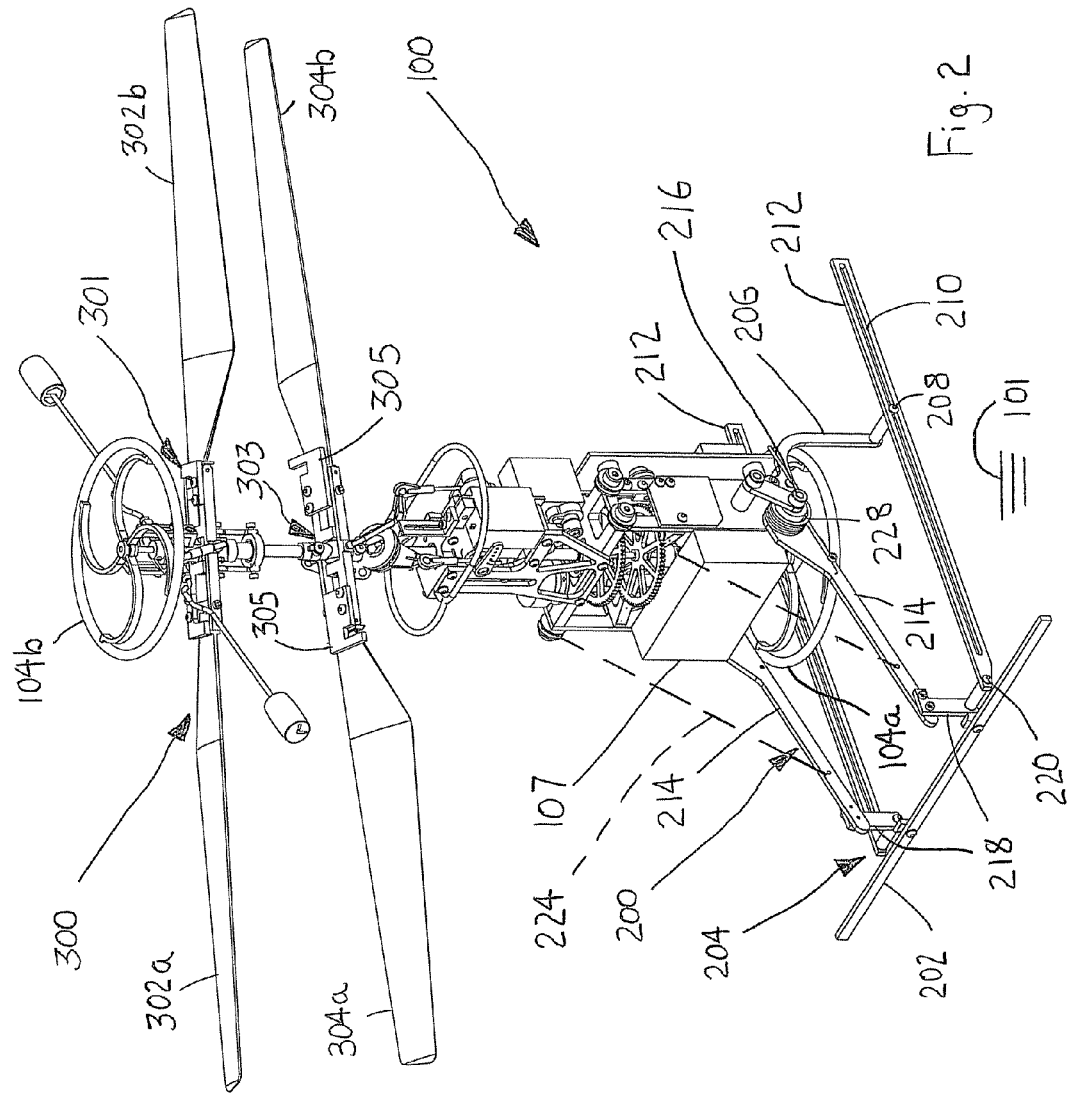

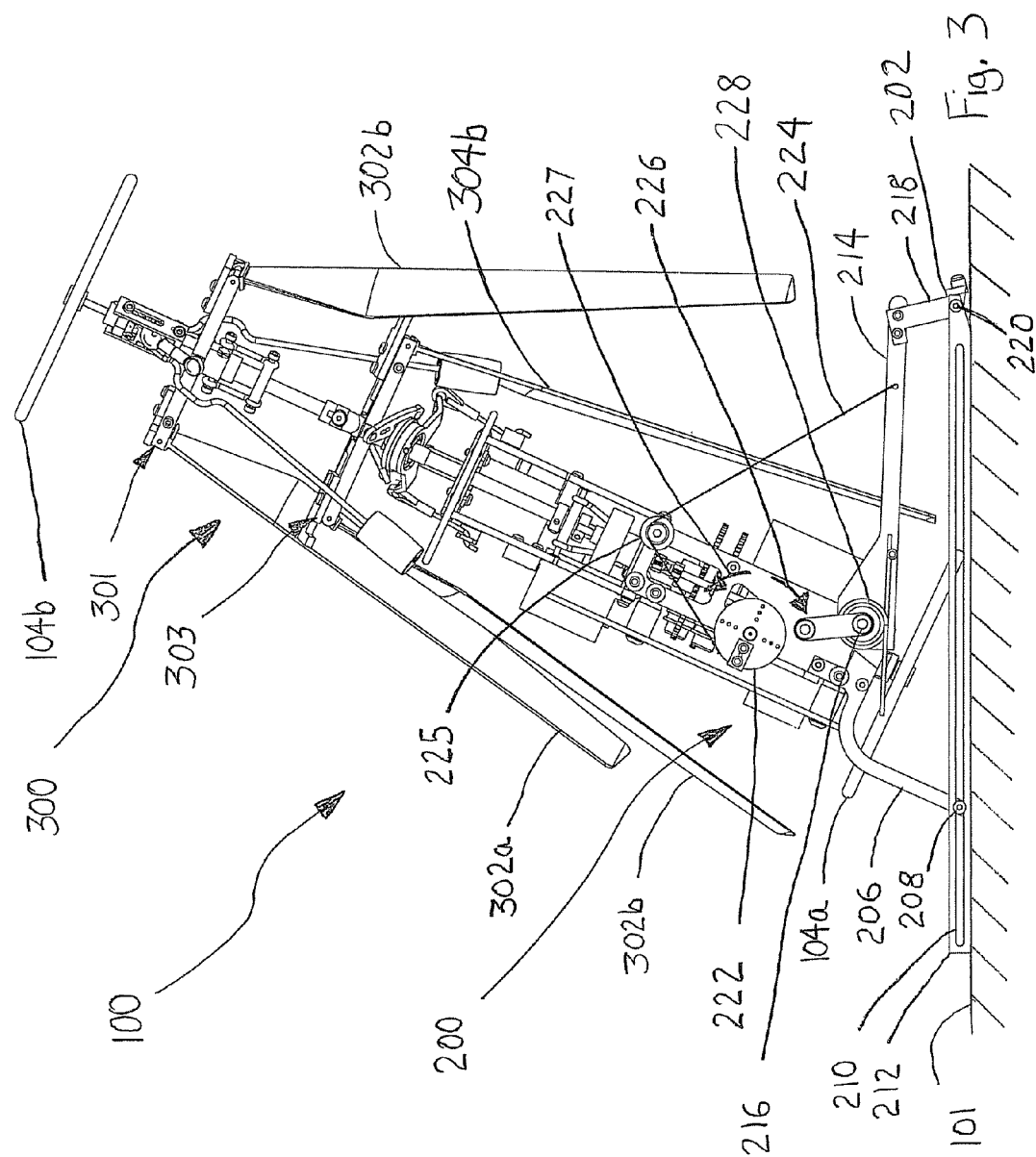

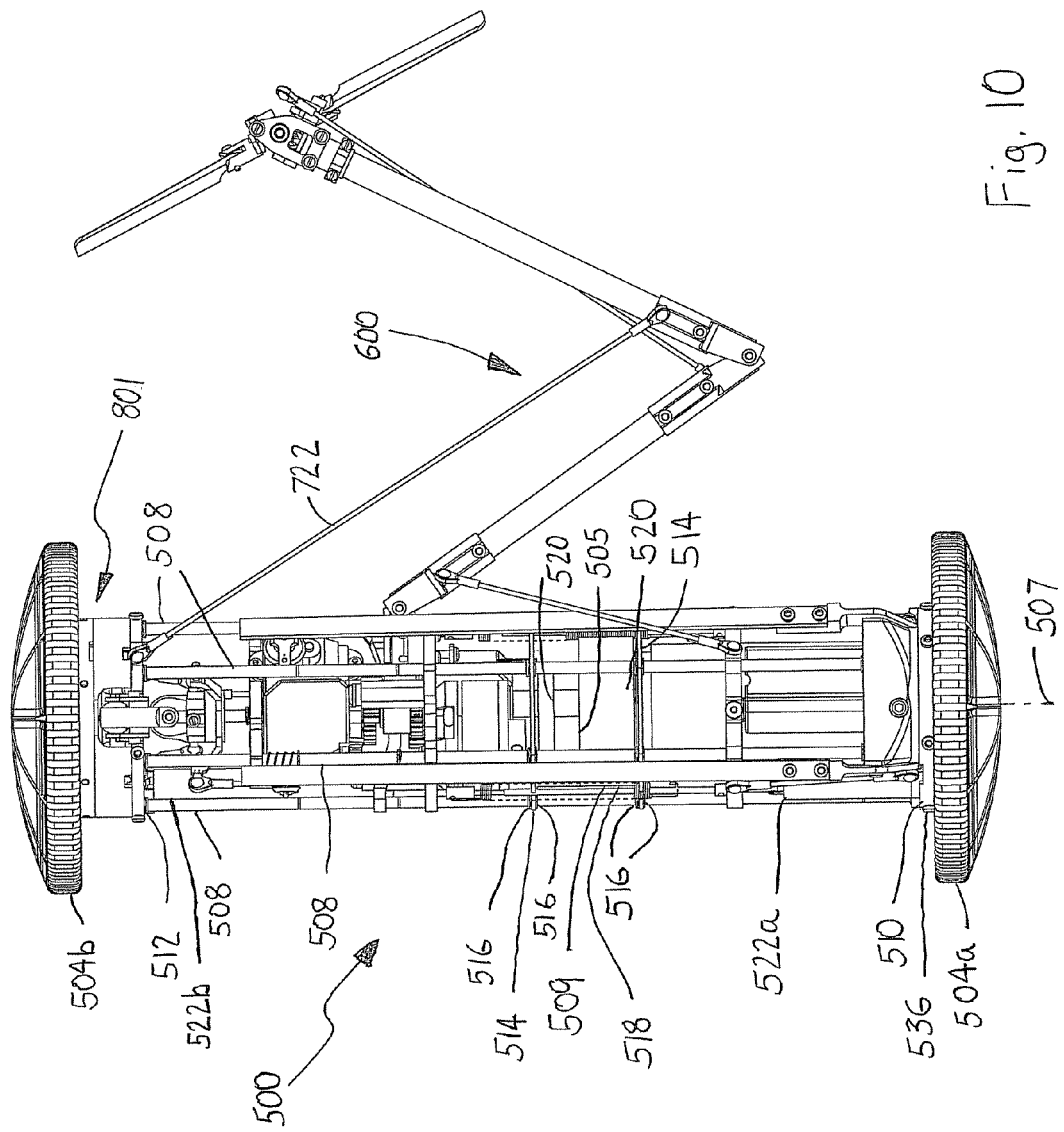

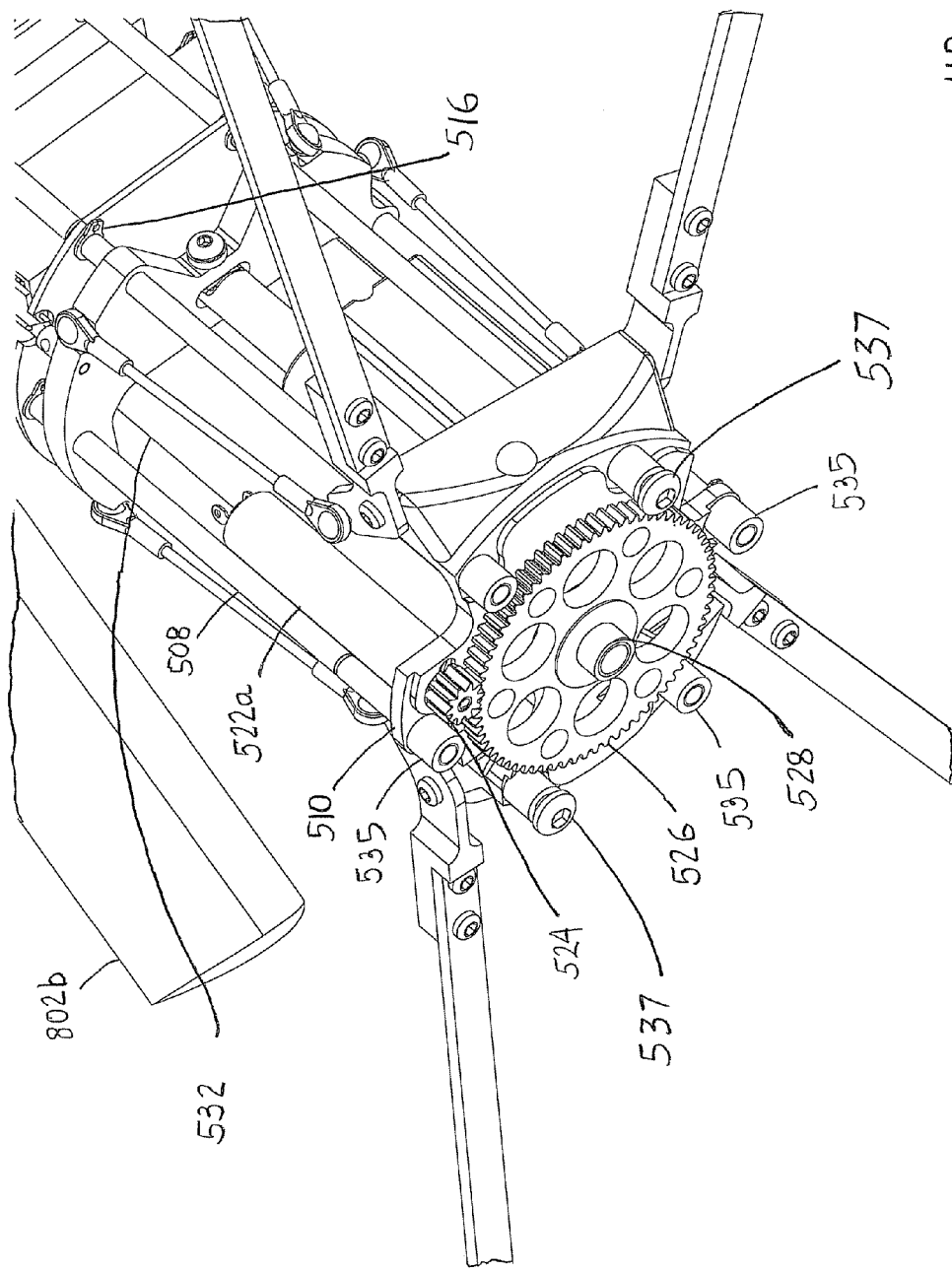

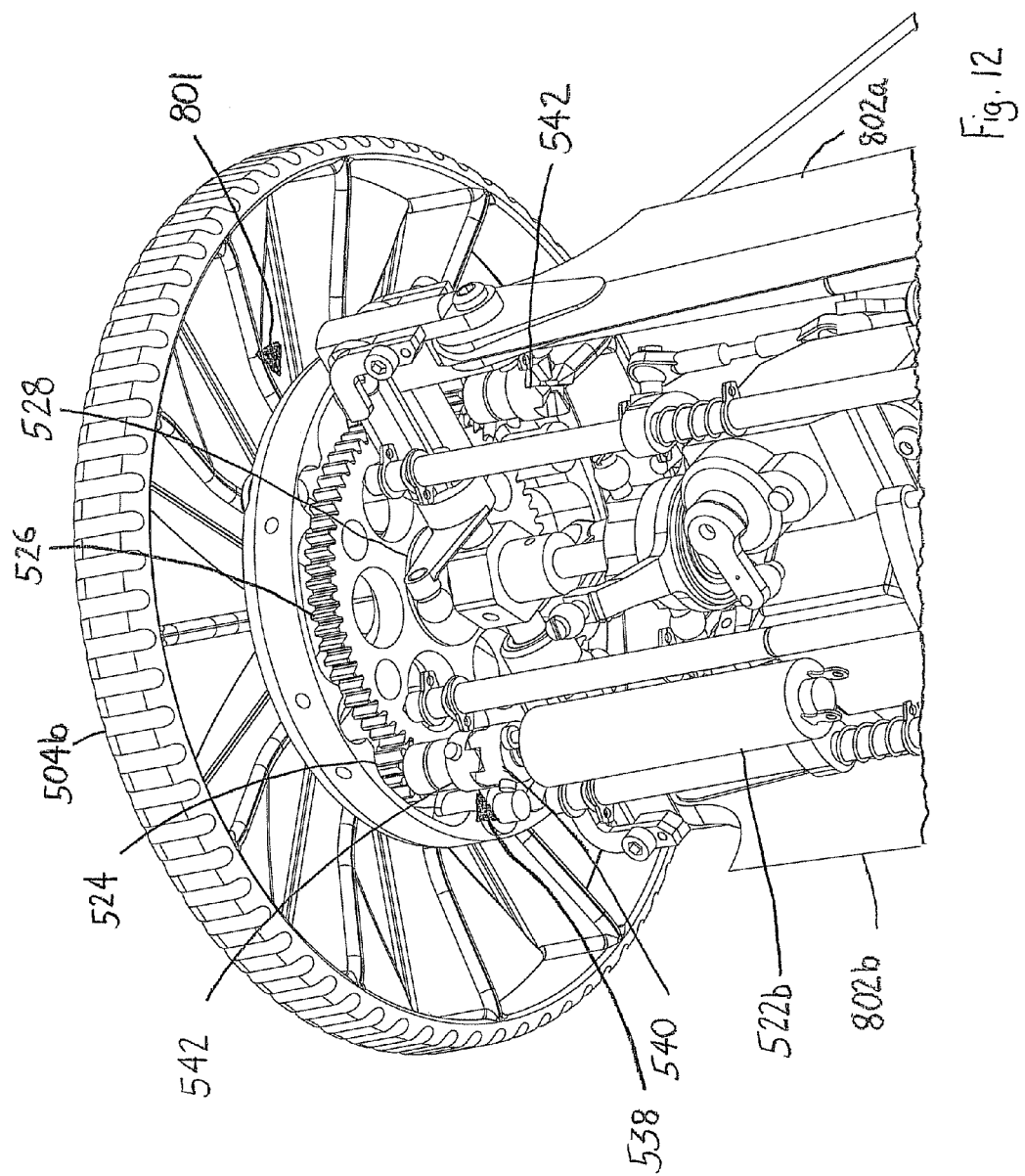

MINIATURE ROBOTIC VEHICLE WITH GROUND AND FLIGHT CAPABILITY

RELATED APPLICATION(S)

This application claims the benefit of U.S. Provisional Application No. 61/285,240, filed Dec. 10, 2009, the content of which is incorporated herein by reference in its entirety.

GOVERNMENT RIGHTS

This invention was made with government support under IIP-0726109 awarded by the National Science Foundation. The government has certain rights in the invention.

TECHNICAL FIELD

Embodiments of the present invention relate generally to robotic vehicles and, more particularly, to a hybrid miniature robot having both a ground transport mode and an aerial flight mode.

BACKGROUND

Reconnaissance and surveillance of hazardous areas or sites of interest are of value to civilian and government agencies alike. While by no means a complete list, hostage and survivor rescue missions, illicit drug raids, reconnaissance, and response to chemical or toxic waste spills are some of the operations that may benefit from a reconnaissance or surveillance component.

Although various systems may satisfactorily provide this capability, one promising solution is provided by the use of small, remotely-operated (or autonomous/semi-autonomous), ground traversing robotic vehicles. Although such miniature robots may be advantageous for their ease of transport to a deployment location and their ability during operation to maneuver in tight spaces, they are generally limited in the terrain and obstacles over which they can navigate when compared to their larger counterparts.

Improving the mobility of small robots is limited by a variety of factors. For instance, the small size of the platform imposes energy constraints by limiting the size of the robot's on-board energy source. Further for example, terrain over which the robot is intended to traverse may pose challenges (e.g., excessive undulations, obstacles, etc.) that are of little consequence to larger units.

Various solutions have been proposed to enable small robots to walk or roll over rough terrain, see, e.g., U.S. Pat. Nos. 6,548,982 to Papanikolopoulos et al., and U.S. Pat. No. 6,860,346 to Burt et al. While these solutions effectively permit travel of smaller robotic vehicles over elevational variations in terrain, they may not enable a robot to traverse treacherous terrain or obstacles of substantial height relative to the robot's size.

One solution proposed is to incorporate a fixed-wing flight mode into an otherwise ground-traversing robot. Such a robot would be able to traverse unforgiving terrain and obstacles by flying over them. For example, it is known to combine fixed-wing flight with the use of wheel-legs for ground movement. While such robotic vehicles are capable of efficient long-distance air travel, they typically require assisted take-off (e.g., an increased starting velocity provided by throwing or otherwise launching the vehicle, or provided by gravity-assisted take-off from a position that is elevated relative to the target, e.g., take-off from a roof or the like). As a result, the flight mode cannot always be activated at will to navigate over rough terrain and obstacles.

Fixed-wing aircraft may also have other drawbacks. For instance, due to the speed required to maintain lift, they may not always be suitable to operating indoors or in other semi-confined spaces.

SUMMARY

The present invention may overcome these and other issues by providing a hybrid robot that incorporates a rotary-wing flight mode in conjunction with a wheeled ground mode. Robots in accordance with embodiments of the present invention may offer several benefits over single mode locomotion devices and fixed wing flying robots, including: un-assisted take off (and thus the ability to switch modes (ground or flight) at will); hovering, which could, for example, allow for airborne inspection with the use of an on-board camera or other sensor; efficient ground-mode travel; and the ability to fly over large obstacles and rough terrain.

While some of these benefits could be realized with a small rotary-wing unmanned aerial vehicle, the added benefit of efficient ground mode travel permits robots in accordance with embodiments of the present invention the ability to conserve energy (e.g., by operating in the ground mode) while being able to fly, when required, to reach the intended target.

In one embodiment, a robotic vehicle is provided. The vehicle includes a body and two wheels attached to the body, wherein the wheels are selectively rotatable, relative to the body, to propel the vehicle over a reference surface. A rotor head assembly is also provided and attached to the body, the rotor head assembly being selectively rotatable relative to the body about a rotor axis. A transforming mechanism is also provided and attached to the body. The transforming mechanism includes two or more members operable to selectively contact the reference surface and reposition the body between: a ground mode, wherein the two wheels contact the reference surface; and a flight mode, wherein one or both of the two wheels are elevated above the reference surface.

In another embodiment, a robotic vehicle is provided including an elongate body having a first end, a second end, and a longitudinal axis extending therebetween. A powered, ground engaging wheel is attached at or near each of the first and second ends of the body, wherein the wheels are selectively rotatable about the longitudinal axis of the body. The vehicle further includes a powered, main rotor head assembly attached to the body at or near the second end and selectively rotatable about the longitudinal axis of the body. The main rotor head assembly includes at least one collapsible main rotor blade. A transforming mechanism is also provided and operable to reposition the vehicle between: a ground mode, wherein the longitudinal axis is parallel to a reference surface upon which the wheels rest; and a flight mode, wherein the longitudinal axis intersects the reference surface.

In another embodiment, a method of switching transport modes of a robotic vehicle is provided, wherein the method includes providing a vehicle having: an elongate body defining a longitudinal axis; two wheels each rotatably coupled to the body; motors connected to the body, the motors operable to independently power the two wheels when the vehicle is in a ground mode; and a main rotor head assembly coupled to the body and configured to rotate about the longitudinal axis. The method further includes contacting a reference surface upon which the vehicle rests with legs of a transforming mechanism attached to the vehicle to reposition the vehicle from: the ground mode, wherein the two wheels are in contact with the reference surface; to a flight mode, wherein one or both of the two wheels are elevated above the reference surface.

The above summary is not intended to describe each embodiment or every implementation of the present invention. Rather, a more complete understanding of the invention will become apparent and appreciated by reference to the following Detailed Description of Exemplary Embodiments in view of the accompanying figures of the drawing.

BRIEF DESCRIPTION OF THE VIEWS OF THE DRAWING

The present invention will be further described with reference to the figures of the drawing, wherein:

FIG. 2 is a perspective view of the vehicle of FIG. 1 after it has been reconfigured into a flight mode;

FIG. 3 is a side elevation view of the vehicle of FIGS. 1 and 2 in a position intermediate to the ground mode and the flight mode;

FIGS. 4A and 4B illustrate a side elevation view of the vehicle of FIG. 2, wherein: FIG. 4A shows the vehicle after transforming to the flight mode, but before engagement of the rotor blades with a drive system; and FIG. 4B shows the vehicle as configured in the flight mode with the rotor blades engaged and rotating;

FIGS. 5A-5C illustrate side elevation and cross sectional views of an end of the vehicle of FIG. 2 showing engagement of a first or upper rotor head assembly (URHA) with the drive system, wherein: FIG. 5A shows the URHA when the vehicle is at an intermediate position between the ground mode and the flight mode (while shown deployed in FIGS. 5A-5C, upper rotor blades of the URHA would not actually deploy for flight until the vehicle reaches the flight mode and the URHA is energized); FIG. 5B shows a side elevation view of the URHA when the vehicle is in the flight mode; and FIG. 5C illustrates a cross sectional view of the URHA and surrounding structure when the vehicle is in the flight mode;

FIGS. 7A and 7B are exemplary performance graphs of one embodiment of the robot, wherein: FIG. 7A is a graph of lift and total power consumption as a function of rotor speed; and FIG. 7B is a graph of the power/lift ratio as a function of rotor speed;

FIG. 10 is a partial side elevation view of the vehicle of FIG. 8 (in the ground mode) with various structure removed for clarity, the vehicle shown rotated such that its longitudinal axis is vertical;

FIGS. 11A-11C illustrate an exemplary first or lower end of the vehicle of FIGS. 8 and 9 with various structure removed, wherein: FIG. 11A is a section view of the vehicle as it transitions from ground mode to flight mode; FIG. 11B is a perspective of the portion of the vehicle illustrated in FIG. 11A; and FIG. 11C is a perspective view of a lower chassis plate of the lower end of the vehicle;

FIG. 12 is a perspective view of an exemplary second or upper end of the vehicle of FIG. 8 (in the ground mode) with various structure removed;

Figure 1:
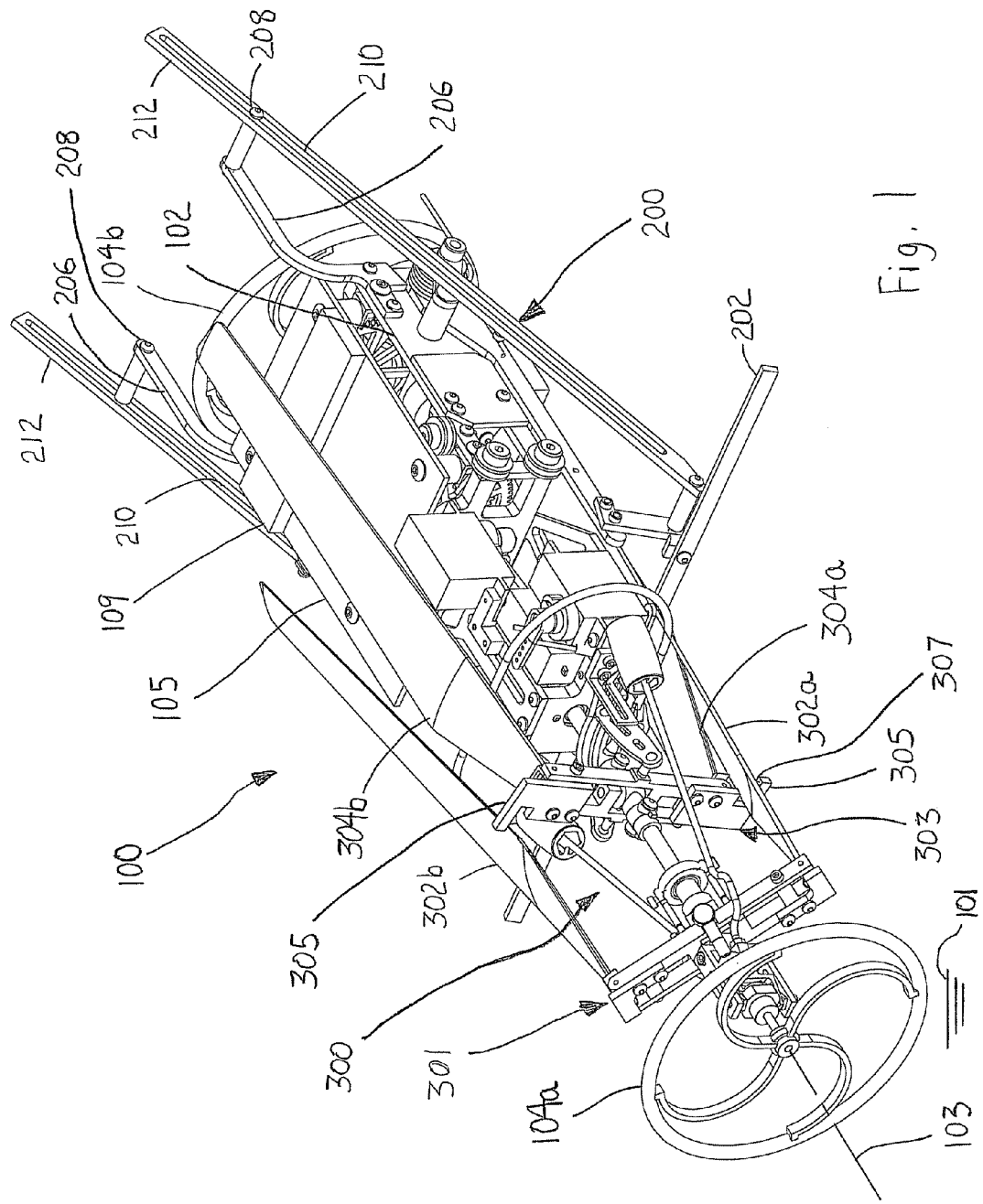
FIG. 1 is a perspective view of a robotic vehicle in accordance with one embodiment of the invention, the vehicle shown in a ground transport mode ("ground mode")

The figures are rendered primarily for clarity and, as a result, are not necessarily drawn to scale. Moreover, certain structure e.g., various chassis portions/components, fasteners, bearings, electrical components (including but not limited to: wiring, cables, etc.), may be shown diagrammatically or removed from some or all of the views to better illustrate aspects of the depicted embodiments, or where inclusion of such structure/components is not necessary to an understanding of the various embodiments of the invention. The lack of illustration/description of such structure/components in a particular figure, however, is not to be interpreted as limiting the scope of the invention in any way.

It is further noted that embodiments described and illustrated herein may incorporate various springs. For clarity of the description, the springs may be illustrated diagrammatically, e.g., represented partially and/or with broken lines. Accordingly, relative spring displacement between the different views may not be represented by changes in actual spring coil spacing.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Generally speaking, embodiments of the present invention are directed to miniature robotic vehicles suitable for a variety of tasks including, observation, surveillance, reconnaissance, and recreation. Although not discussed in detail herein, robotic vehicles in accordance with embodiments of the present invention may include a payload including (but not limited to) one or more on-board sensors, e.g., cameras, gas sensors, etc., capable of detecting and transmitting information regarding the surveillance site to a remote location.

As described below, embodiments of the present invention may provide a robot having a hybrid locomotion system. For example, in addition to a powered ground transport mode ("ground mode"), robots in accordance with embodiments of the present invention may further incorporate a rotary wing flight mode to permit traversal of rough terrain (e.g., terrain which the robot may have trouble traversing in its ground mode) and obstacles. Moreover, robots as described herein may be reconfigured between these two modes at will, permitting reconfiguration between these modes as the ground environment dictates. The inclusion of both transport modes is advantageous as, for example, the flight mode gives the robot increased versatility with respect to navigable terrain types and positioning in three-dimensional space, while the ground mode provides potentially greater run time (it is anticipated that energy usage during flying is approximately 3-30 times that of rolling) and, in many instances, finer motion control.

Embodiments of the robotic vehicles as described herein may be controlled by any number of techniques including, for example, autonomous or semi-autonomous control, remote control, or combinations thereof. In some embodiments, the robotic vehicle is controlled by an operator via a remote computer, e.g., handheld communications device. Data collected by the robotic vehicle's sensors may be wirelessly transmitted to the remote computer to provide real-time feedback. In other embodiments of the present invention, multiple robots may operate as a team. In this instance, the robots may be independently controlled by a user or group of users and/or may communicate with each other to permit autonomous or semi-autonomous control based on feedback from one another.

The term "remote computer" is used herein to indicate most any device that is capable of remotely communicating with (e.g., transmitting data to and/or receiving data from) the robotic vehicle. Such computers may include, for example, handheld or body-supported (wearable) computers, laptop computers, and workstations. Moreover, most any communication protocol is contemplated including, for example, short-range radio frequency, satellite, cellular, and wireless local area network (WLAN such as IEEE 802.11x protocols).

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as left, right, forward, rearward, top, bottom, side, upper, lower, above, below, horizontal, vertical, and the like may be used herein and, if so, are from the perspective observed in the particular figure, or as observed when the subject device is in the described operating position. These terms are used only to simplify the description, however, and not to limit the scope of the invention in any way.

The suffixes "a" and "b" may be used throughout this description to denote various right-side (or lower) and left-side (or upper) parts/features, respectively. However, in most pertinent respects, the parts/features denoted with "a" and "b" suffixes in these instances are substantially identical to, or mirror images of, one another. It is understood that, unless otherwise noted, the description of an individual part/feature (e.g., part/feature identified with an "a" suffix) also applies to the related part/feature (e.g., part/feature identified with a "b" suffix). Similarly, the description of a part/feature identified with no suffix may apply, unless noted otherwise, to both the corresponding left/lower and right/upper part/feature. In other instances, alphabetic suffixes (e.g., a, b, c, d, etc.) may also be used herein to describe various subassemblies of a component, e.g., the races of a bearing.

Various connections are described and/or illustrated herein as "hinges," "pivot joints," and/or "pivots." These terms are understood to have an identical meaning and may refer to most any mechanical joining of two or more members that permits at least one of the members to pivot or rotate, e.g., about an axis, relative to the other member(s). Such pivoting functionality may include, but is not limited to: simple pinned joints; spherical rod end/ball-and-socket connections; or any other pivot construction that provides the desired pivoting relationship.

With this brief introduction, robotic vehicles, systems, and methods in accordance with exemplary embodiments of the present invention will now be described. While described and illustrated herein in the context of distinct embodiments, those of skill in the art will appreciate that aspects and features of the various embodiments may be interchanged to accommodate numerous variations without departing from the scope of the invention. That is, the embodiments described and illustrated herein are intended to be exemplary only and variations, modifications, and combinations of the described embodiments are certainly contemplated.

Exemplary Embodiments of FIGS. 1-7B

FIGS. 1-7B illustrate and/or otherwise describe a robotic vehicle 100 (also referred to herein as "robot") in accordance with one embodiment of the invention. While the embodiments described herein are considered to be miniature (e.g., mass less than about 1000 grams, and, in some embodiments, less than about 500 grams), those of skill in the art will appreciate that the concepts described herein may be easily scaled to suit most any application.

Robotic vehicles in accordance with embodiments of the present invention and illustrated herein in FIGS. 1-7B may include features described in: *More Than Meets the Eye: A Hybrid-Locomotion Robot with Rotary Flight and Wheel Modes*, Kossett et al., 2009 IEEE/RSJ International Conference on Intelligent Robots and Systems, Oct. 11-15, 2009, Hyatt Regency St. Louis Riverfront, St. Louis, Mo., USA; and *Design of an Improved Land/air Miniature Robot*, Kossett et al., 2010 IEEE International Conference on Robotics and Automation (ICRA), p 632-637, May 3-7, 2010, Anchorage, Ak., USA.

As shown in FIG. 1, the components of the vehicle 100 may generally include a body, e.g., an elongate body 102 having first and second ends, supported for rolling engagement with a reference, e.g., ground, surface 101 by one or more, e.g., two, powered, ground engaging wheels 104. Each wheel may be coupled to the body (e.g., at or near the first and second ends) and selectively rotatable (relative to the body) to propel the vehicle over the ground surface 101. The body may, in the illustrated embodiment, be formed by an underlying structural chassis as depicted in FIG. 1. Although illustrated herein as open, the body could also be formed as an enclosed volume, e.g., via the use of a tubular shell or semi-cylindrical panels. As further shown in FIG. 1, the body 102 may also define a longitudinal axis 103 extending between the first and second ends. While not limited to any particular size, the robotic vehicle may, in one embodiment, have specifications as shown in Table I.

TABLE I

| Metric | Value |
| --- | --- |
| Wheel Track Width | 260 millimeters (mm) |
| Ground Mode Width | 290 to 320 mm |
| Ground Mode Height | 81 mm |
| Ground Mode Length | 185 mm |
| Rotor Diameter | 373 mm |
| Flight Mode Height | 290 mm |
| Battery | 730 mAh 3-cell Lithium Polymer |
| Mass | Approximately 300 grams (g) |

Wherein: "wheel track width" is measured transversely from centerline-to-centerline of each wheel; "ground mode width" is measured transversely across the widest dimension when the vehicle is in ground mode; "ground mode height" (or "flight mode height") is measured vertically across the tallest dimension when the vehicle is configured in ground mode (or flight mode); and "ground mode length" is measured across the longest dimension in the direction of ground travel when the vehicle is in ground mode. These specifications are exemplary, however, as other sizes and configurations are certainly possible without departing from the scope of the invention.

As with most components of the illustrated embodiment, the wheels 104 are designed to accomplish their intended purpose with minimal weight. Accordingly, the wheels may be constructed as a plastic ring with a few structural spokes to provide the necessary radial rigidity. For example, in one embodiment, each wheel may be a remote controlled glider (e.g., RC glider) wheel such as model GW/WH01/76 wheel from by Grand Wing System USA, Inc., of City of Industry, Calif., USA. In other embodiments, different wheel configurations may be utilized, e.g., wheels made from high flotation or shock absorbing materials.

In the ground mode, independent motors (as further described below), may power each of the wheels 104. Moreover, a portion of the vehicle (e.g., reference numeral 202) may act as a tail to counter the rotation (in both directions) of the body 102 due to the wheel torque. As a result, the orientation of the robot may be generally maintained during ground transportation. The speed and direction of the wheels 104 may be independently controlled to effect speed and direction of the robot 100 (similar to those vehicles described and illustrated in, for example, U.S. Pat. No. 6,548,982 to Papanikolopoulos et al).

Figure 4A:
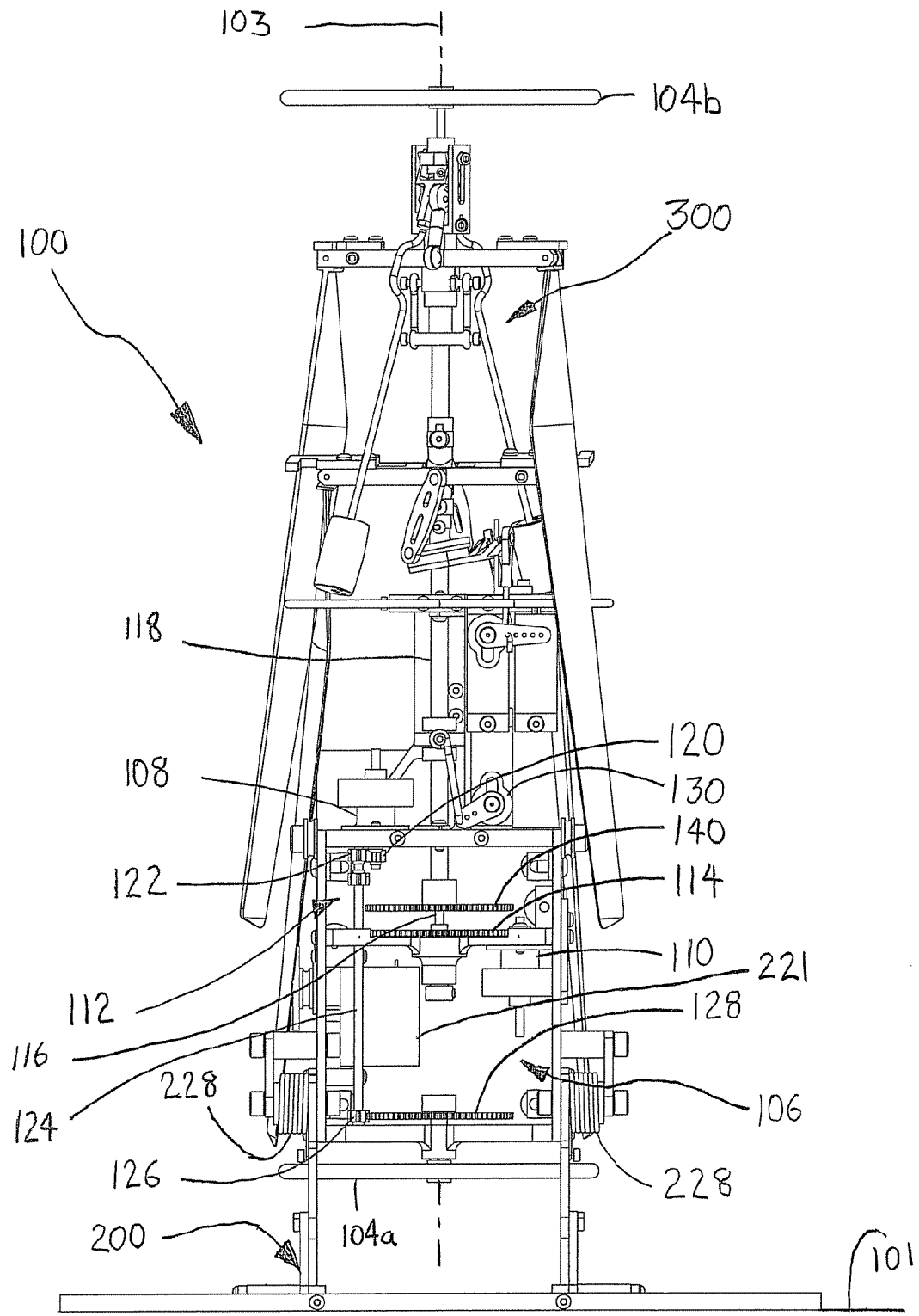

Unlike other known robots, however, the vehicle 100 may be reconfigured to an air or flight mode as illustrated in FIG. 2. The transition between the ground transport mode and the flight mode may be effected by a transforming mechanism 200 as further explained below. In the flight mode, the body 102 is first set on end as shown in FIG. 4A so that a rotor system 300 may be used. Once the vehicle is positioned as shown in FIG. 4A, the rotor system 300 may be selectively powered (e.g., selectively coupled to the motors as further described below) to generate sufficient lift to permit rotary wing flight (e.g., like a helicopter).

In the illustrated embodiment of FIGS. 1-7B, the rotor system 300 is configured as two counter-rotating rotors that form both a first or upper rotor head assembly (URHA) 301 and a second or lower rotor head assembly (LRHA) 303. Two or more rotor blades (302a, 302b and 304a, 304b; see FIG. 2) may be attached to their respective rotor head assemblies with a hinge. Such a counter-rotating system may minimize the torque to the body 102 of the robot, potentially improving flight control. However, embodiments wherein a single lift rotor is utilized are also contemplated. In case of the latter, a secondary rotor (see, e.g., embodiments of FIGS. 8-24) may be used to counteract the torque resulting from the single lift rotor in a manner similar to the tail rotor on a helicopter.

As FIG. 1 illustrates, the rotor system 300 may be stowed (placed in a stowed position) during ground mode by folding against the body 102. Such a construction allows the rotor blades to be moved to a deployed position to provide a large rotor diameter in flight mode, but collapsed to a much smaller stowed volume in the ground mode. In the illustrated embodiment, folding is accomplished by a passive hinge. However, other embodiments may utilize a different hinge design, e.g., a biased or active hinge, as further described below.

With this general overview, the components and operation of an exemplary embodiment of the invention will now be described. While such an embodiment is described in detail below, the description is nonetheless illustrative and other embodiments are certainly possible without departing from the scope of the invention.

In the ground mode (see FIG. 1) the rigid tail 202 of the transforming mechanism 200 may operate to hold the lowermost rotor blades 302a and 304a against the body (the upper rotor blades 302b and 304b are held in place via gravity). Other embodiments may eliminate this functionality of the tail 202 by using an active hinge to attach each rotor blade to the robot. Once again, the specific references to rotor blades 302a, 302b, 304a, and 304b (as well as to any other rotor blades described herein with "a" and "b" suffixes) is for description only. Those of skill in the art will realize that, for example, either or both of the blades 302b and 304b could end up being a "lowermost" blade if either the URHA or LRHA were to stop at a position that is 180 degrees from that shown in the figures.

In the illustrated embodiment, the center of gravity may be located along the longitudinal axis 103 of the robot (e.g., which also forms the wheel and the rotor axis) to assist with flight. Accordingly, the tail 202 may extend outwardly from both sides of the vehicle 100 as torque effects (e.g., the tendency of the robot to spin about the wheels while the wheels stay stationary) during ground mode operation are not countered by any offset weight distribution of the body 102.

In one embodiment, the rotor system and much of the flight control system is based upon the commercially available radio-controlled helicopter model Blade CX2 distributed by the E-flite division of Horizon Hobby, Inc. of Champaign, Ill., USA. However, other embodiments may certainly tailor the flight control system to optimize performance for the intended use.

To transform the robot 100 from the ground mode of FIG. 1 to the flight mode of FIG. 2, the illustrative transforming mechanism 200 as shown in FIGS. 1-3 may be utilized. As shown in FIG. 2, the transforming mechanism 200 provides a landing gear or base 204 of a size sufficient to provide stability to the vehicle 100 when taking off and landing. Moreover, as described above, at least a portion (e.g., tail 202) of the mechanism 200 may provide a catch to retain the rotor blades when the vehicle is in the ground mode.

FIG. 3 illustrates the mechanism 200 in the process of transforming the vehicle 100 between the two modes. As shown in this view, the mechanism 200 may include two fixed arms 206 (see also FIG. 1) having a pin 208 attached at their respective distal ends. Each pin may be slidingly attached to a slot 210 formed in an elongate member 212 that is itself pivotally attached relative to the tail 202, e.g., pivotally attached to a protruding structure 218 of the tail. A biased member 214 may be pivotally attached at a first end to the body 102 at a pivot joint 216. The member 214 may have a second end upon which is formed or otherwise rigidly attached the structure 218. The structure 218 may, in turn, be rigidly attached to the tail 202 (see also FIG. 2). A pivot joint 220, formed by a pin attached to the structure 218, may pivotally connect the tail 202 (e.g., the structure 218) to the elongate member 212. As a result, the illustrative transforming mechanism 200 may form a four bar linkage structure as best shown in FIG. 3.

To move the mechanism 200 between the position shown in FIG. 1 and the position shown in FIG. 2, a servo motor 221 (see FIG. 4A) may be used. The servo motor may have its output shaft attached to a spool 222 (see FIG. 3). A cable 224 may have its first end attached to the spool 222 and be entrained around one or more pulleys 225 as shown in FIG. 3. The cable 224 may have its second end attached to the biased member 214. By energizing the spool 222 in a first direction 226, the mechanism 200 may be moved towards the extended position of FIG. 2 (e.g., towards the flight mode). To bias the member 214 (and thus the mechanism 200) towards this extended position, a biasing member, e.g., torsion spring 228 may be provided at one or both pivot joints 216. The springs 228 may bias the mechanism 200 towards the position illustrated in FIG. 2. By spooling the cable out sufficiently, the mechanism is permitted to move towards the position of FIG. 2 at a controlled rate.

In the ground mode, the wheel axis 103 may be generally parallel to the ground surface 101 as shown in FIG. 1. However, upon reaching the flight mode as shown in FIG. 2, the wheel axis may intersect the ground surface, e.g., the wheel axis when in the flight mode may be generally orthogonal to the wheel axis when in the ground mode. Upon reaching the position shown in FIG. 2, the lower wheel 104 may be completely spaced away from the ground surface 101. As a result, the wheel 104 may turn without contacting the ground as further explained below. To return the mechanism 200 to the position of FIG. 1, the spool 222 may be rotated in the opposite direction (direction 227 in FIG. 3), wherein the cable 224 retracts the mechanism 200 against the biasing force. As the mechanism nears the position of FIG. 1, it traps the lower set of rotor blades against the body 102. As a result, the robot may again travel in the ground transport mode without interference from the rotor system 300.

Before describing operation in the flight mode, an exemplary drive system 106 will be described primarily with reference to FIGS. 4A-4B (note that while FIG. 4A illustrates the robot 100 in the flight mode (e.g., with the mechanism 200 extended), this figure is shown before engagement of the clutches that drive the rotor assemblies, e.g., it illustrates the drive system configured for the ground mode).

In one embodiment, the drive system 106 may include a first motor 108, a second motor 110, and a transmission 112. The motors are each connected to a power supply, e.g., one or more on board two or three-cell lithium polymer batteries 107 (see FIG. 2). Moreover, as described above, the motors may be independently controlled, e.g., semi-autonomously/autonomously, or by a remote operator via an onboard receiver (not shown). In one embodiment, the motors are model C10 heli PKG motors from Strong RC Motors of Troy, Mich., USA, which is a modified C10 brushless motor from by ELE Hobby Science & Technology Co., Ltd of XiaoGan City, Hubei, China.

The second motor 110 includes an output shaft having a pinion gear (not shown) that meshes with a larger second drive gear 114. The drive gear 114 is keyed at a first end to a small inner shaft 116 that passes through a hollow center of a larger outer shaft 118. A second end of the inner shaft 116 is keyed to the second or upper wheel 104b. As a result, powering the second motor 110 effectively drives the upper wheel 104b.

The first motor 108 also includes an output shaft having a pinion gear 120 that drives a pinion gear 122 at a first end of an elongate shaft 124. The second end of the shaft 124 includes a pinion gear 126 that meshes with a first drive gear 128. The drive gear 128 is keyed to the first wheel 104a. As a result, powering the first motor 108 effectively drives the first wheel 104a. By independently controlling the speed and direction of each motor 108 and 110 (e.g., each wheel 104a and 104b), the speed and direction of the robot 100 can be controlled during ground mode operation.

During the transition to flight mode, the exemplary robot 100 may undergo two sequential actions. The first involves the activation of the transforming mechanism 200 as already described above to place the robot from a first, e.g., generally horizontal, orientation relative to the ground surface 101 (see FIG. 1), to a second, e.g., generally vertical (relative to the ground surface), orientation (see FIGS. 2 and 4A). The second action involves reconfiguring the transmission 112 of the drive system 106 to permit the motors 108 and 110 to drive the rotor system 300. In the illustrated embodiment, this second action is achieved by activation of a servo motor (also referred to herein as a servo) 130 (see FIG. 4B). A servo motor, as used herein, refers to a motor or similar mechanism that utilizes an error feedback signal to control its output, e.g., a position of its output shaft. As the servo 130 actuates, it causes an arm 132 of the servo (see, e.g., FIG. 4B) to pivot in a first direction 134. A link 136 has a first end attached to a distal end of the arm 132 and a second end attached to a collar 138 operatively fixed to the outer shaft 118 via a bearing. As a result, selective actuation of the servo 130 causes the collar 138, and thus the outer shaft 118, to move upwardly as viewed in FIG. 4B.

Figure 4B:
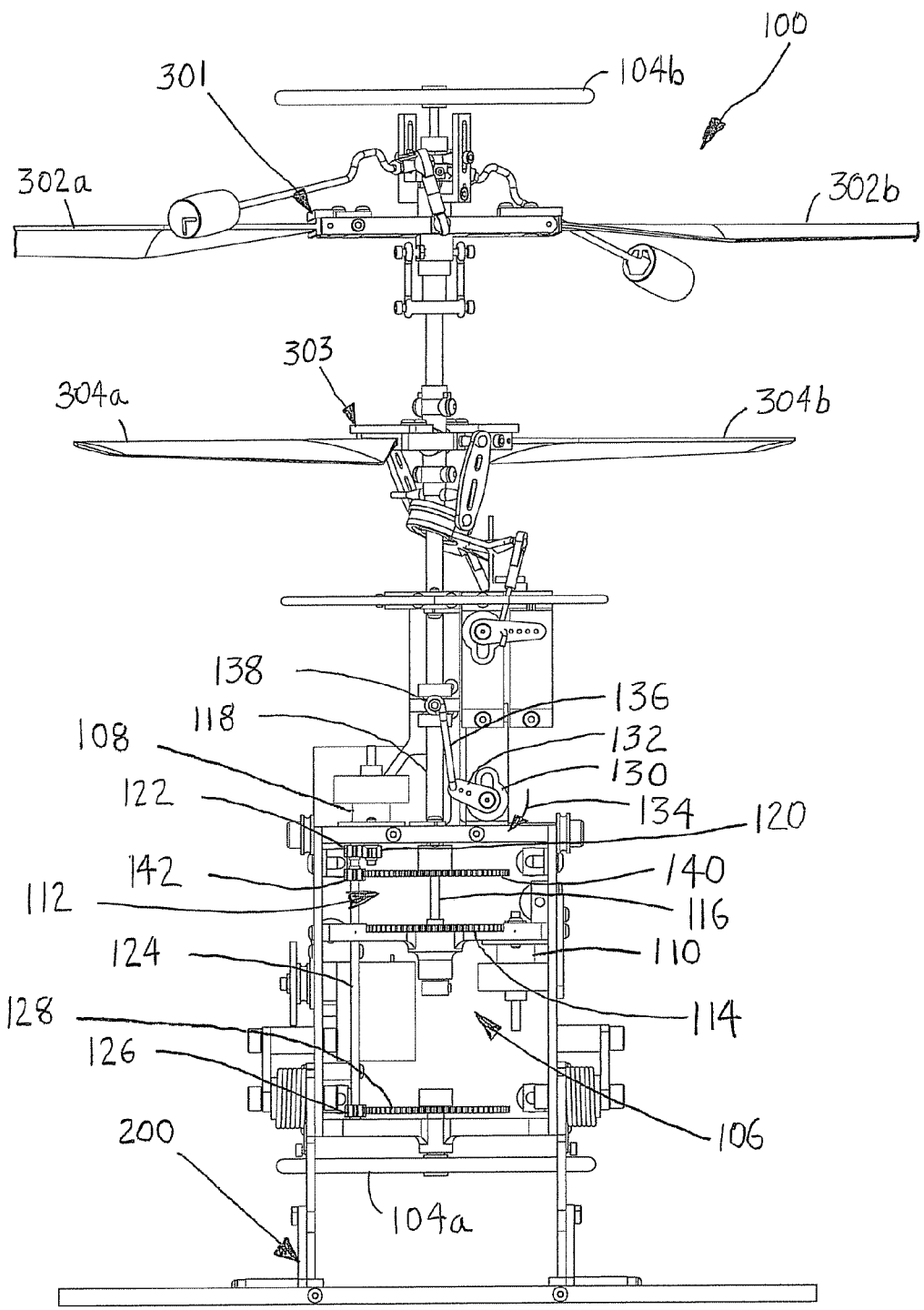

As the outer shaft 118 moves upwardly, a third drive gear 140 fixed to a first or lower end of the outer shaft moves from the position shown in FIG. 4A to the position shown in FIG. 4B. As it reaches the position of FIG. 4B, the third drive gear 140 meshes with a pinion gear 142 fixed to the elongate shaft 124. As a result, the outer shaft 118 may now be powered by the first motor 108. As the outer shaft 118 is keyed to the LRHA 303, the first motor 108 may also now power the LRHA.

In the illustrated embodiment, the wheels remain powered even when the rotor head assemblies are driven (and are driven at the same gearing). However, this configuration is not limiting, e.g., other embodiments may de-couple the wheels from the drive system when the rotor head assemblies are powered. In still other embodiments described below, a first motor or group of motors may be used to drive the wheels while a second motor or group of motors may drive the rotor head assemblies. Still further, different gear ratios may be used for the wheels as compared to that of the rotor head assemblies.

Engagement of the drive system with the URHA 301 will now be described with reference primarily to FIGS. 5A-5C. In general, the URHA 301 is first translated along a longitudinal axis of the vehicle (e.g., along the inner shaft 116) via the translation of the outer shaft 118 that is effected by the actuation of the servo 130 (described above). Upon reaching the desired position, the assembly 301 mechanically couples to the inner shaft 116 (as further described below) and is thus powered by the second motor 110.

By utilizing a translating outer shaft 118, the center of gravity of the robot 100 may move during the transformation between the ground mode and the flight mode. In one embodiment, the robot is configured to place the center of gravity near the geometric center of the robot when the robot is in flight mode. This configuration may yield a longitudinally offset center of gravity, however, when in the ground mode. As a result, in one embodiment, one of the wheels may bear more load (e.g., ⅔ of the robot's weight) than the other. Such a configuration may offer benefits including, for example, keeping the center of gravity low during flight mode, and assisting the transforming mechanism during transition from ground mode to flight mode.

An endcap 306 may be fixed to an upper end of the outer shaft 118. A first or lower bearing 308 may be positioned on the outer shaft 118 below the endcap 306. As shown in FIG. 5C, the lower bearing 308 includes an inner race 308a positioned with clearance near the outer shaft 118, and an outer race 308b to which a pair of links 310 are pivotally attached via fasteners 313. The fasteners 313 may thread into a ring and then clamp to the outer race 308b of the bearing 308.

The upper end of the endcap 306 may form a cup which receives therein a second or upper bearing 312. The upper bearing 312 may include an inner race 312a positioned with clearance near the inner shaft 116, and an outer race 312b that sits within the cup formed by the endcap 306.

Figure 5A:
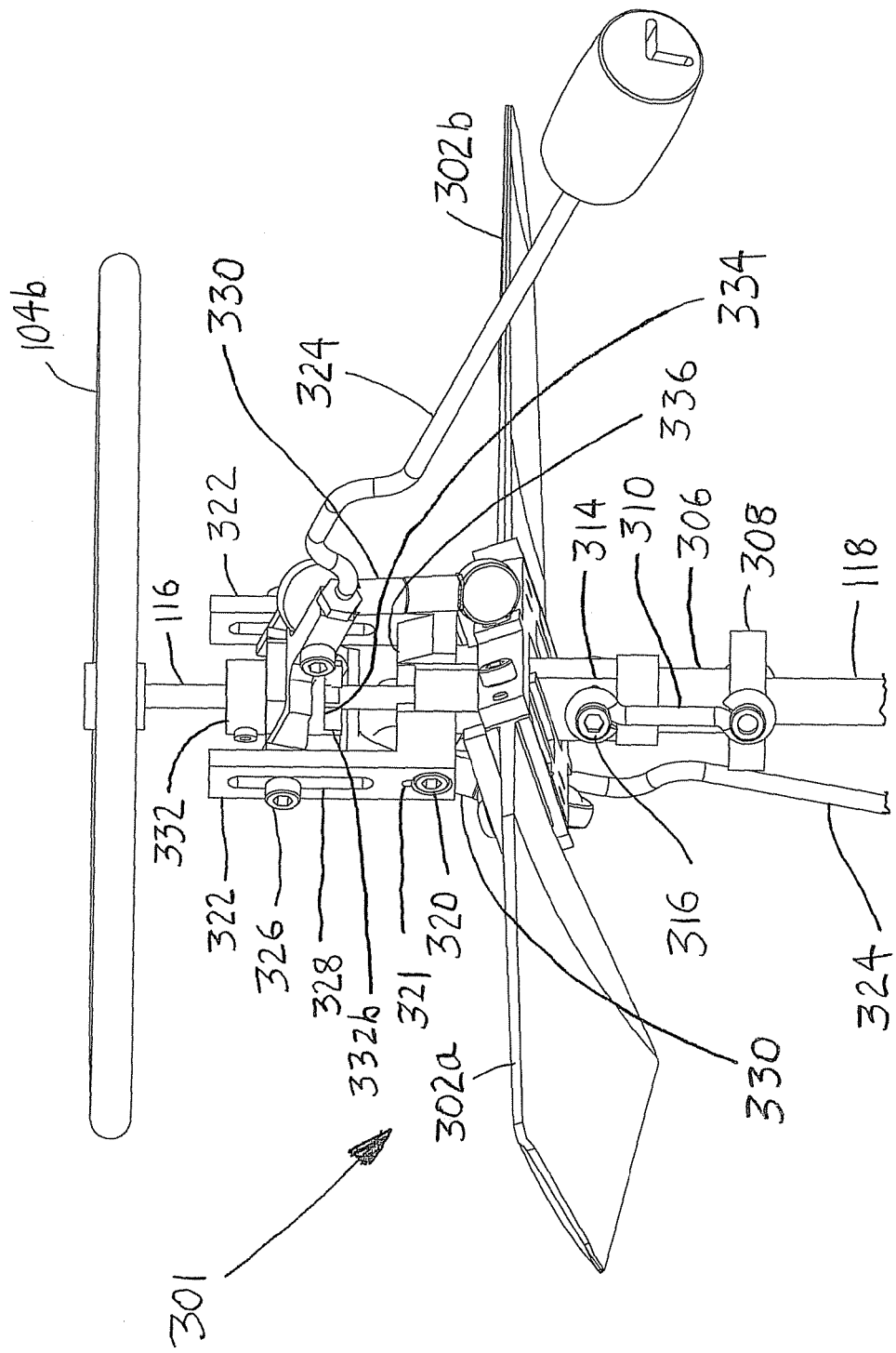
Figure 5B:
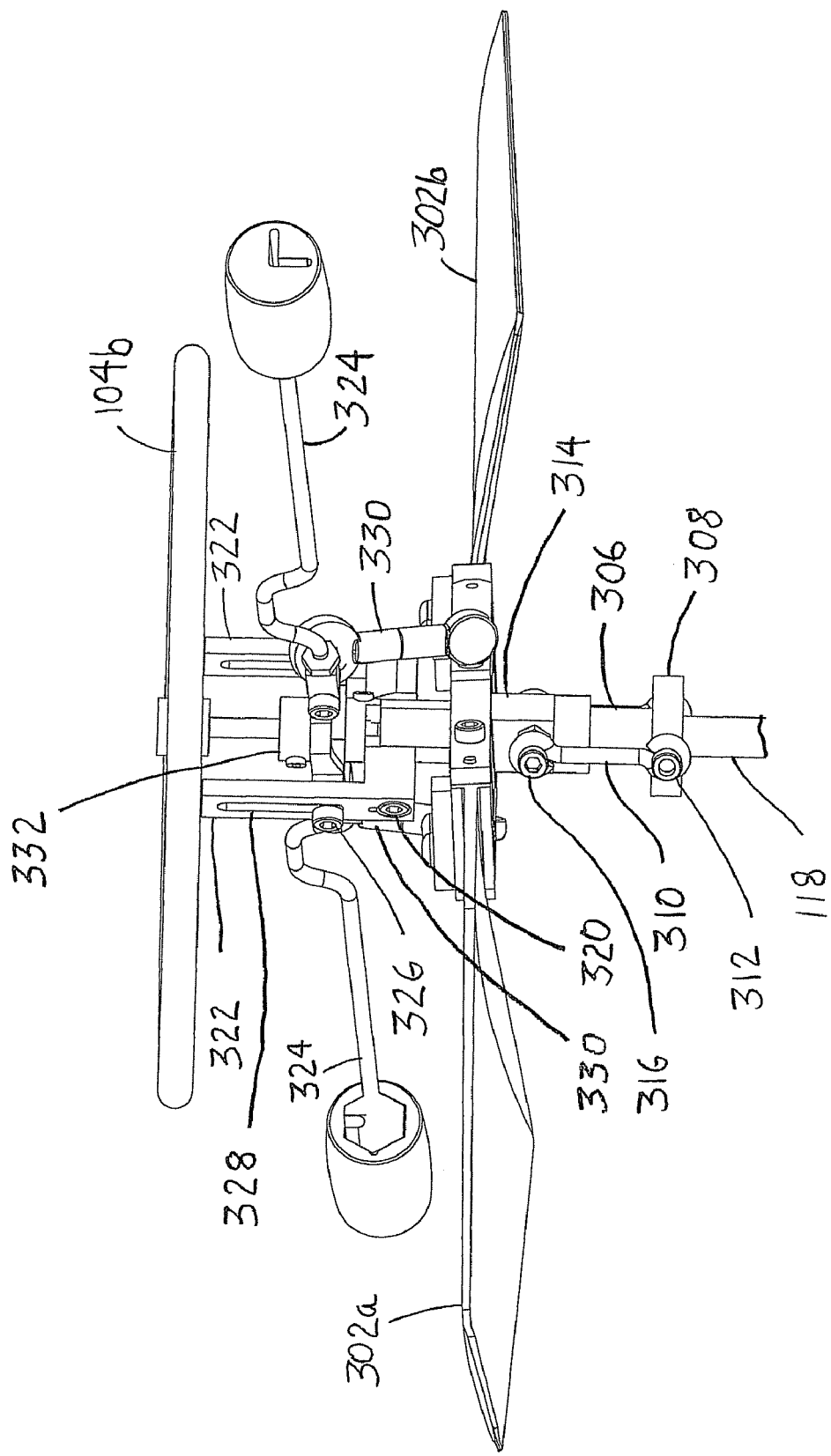
Figure 5C:
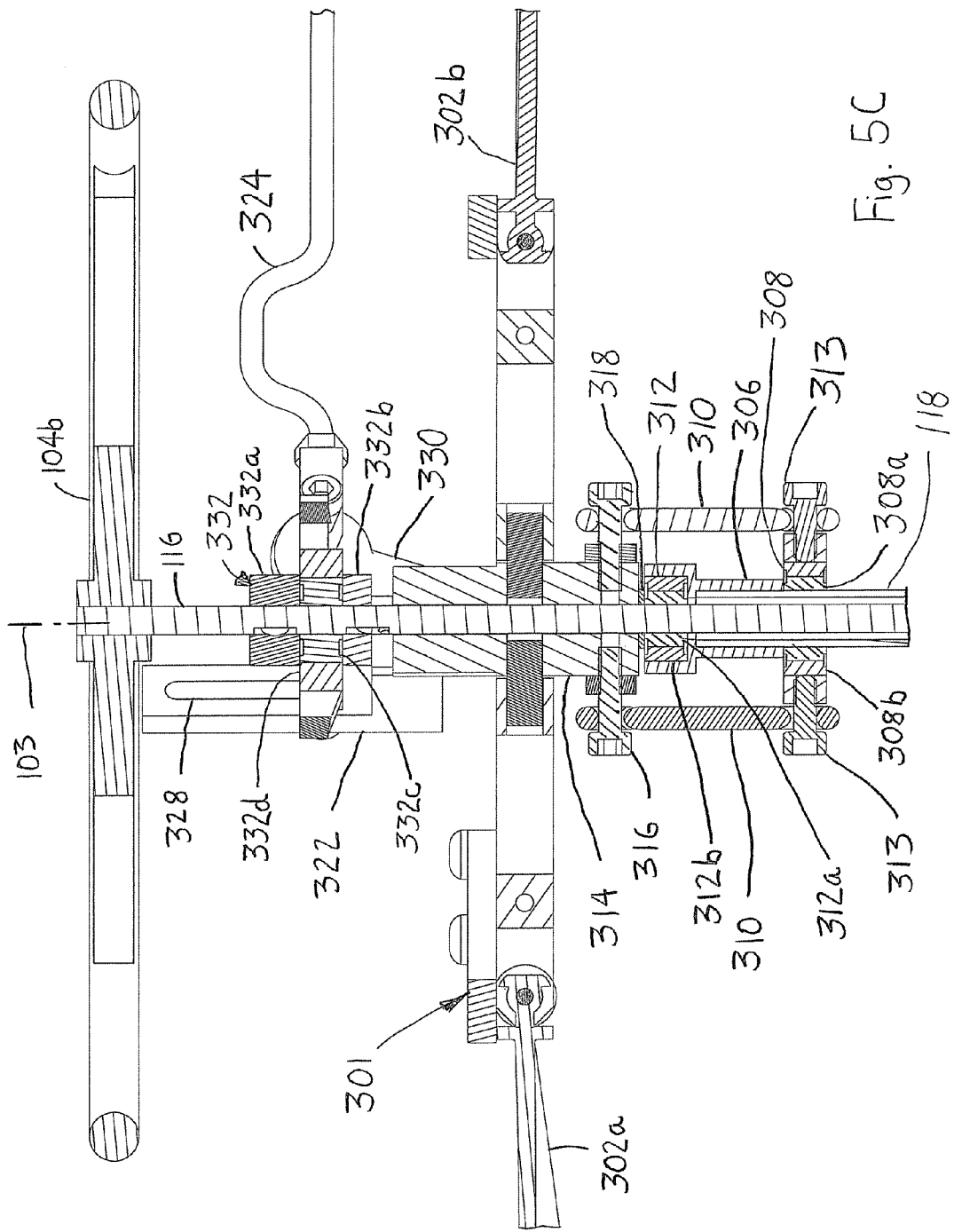

The upper end of each link 310 may attach to a block 314 of the URHA 301 as shown in FIGS. 5A-5C via fasteners 316. A washer 318 (see FIG. 5C) may be positioned between the block 314 and the bearing 312 to ensure that the block 314 contacts the inner race 312a (as opposed to the outer race 312b).

Attached to a distal or upper end of the block 314 via a fastener 320 are two L-shaped brackets 322 that act as a yoke that pivotally supports two stabilizer bars 324 (together forming a stabilizer) via a pin 326. To ensure the brackets 322 remain in the desired orientation relative to the block 314 when using only a single fastener 320 for each bracket, a pin 321 (see FIG. 5A), passing through aligned openings in the block and the bracket, may also be provided. The stabilizer bars 324 may, in one embodiment, ride on a bearing between the stabilizer and the inner shaft 116 as shown in FIG. 5C. The pin 326 may translate within a slot 328 formed in each L-shaped bracket 322. A pair of arms 330 may interconnect each of the stabilizer bars 324 (one bar 324 shown deployed and one folded in FIG. 5A) with respective opposite rotor blades of the URHA 301.

A collar assembly 332 may be provided having an upper collar 332a fixed to the inner shaft 116 (e.g., with a set screw or keyway). The collar assembly 332 may act as a stop to limit upward translation of the URHA 301. As shown in FIG. 5A, the lower end of the collar assembly 332 may define a lower collar 332b having slots or cutouts 334 operable to receive mating portions 336 of the block 314 to act as a clutch to couple the URHA 301 to the drive system. As a result, when the outer shaft 118 is displaced upwardly, the mating portions 336 may engage the slots 334, thereby rotationally fixing the collar 332 to the block 314, and thus the URHA 301. During operation, the L-shaped brackets 322 may force the stabilizer bars 324 to maintain a position relative to the upper rotor blades 302a, 302b.

Between the upper and lower collars 332a and 332b is a bearing 332c having a ring 332d. The pins 326 may threadably engage the ring 332d. This collar assembly configuration may allow the stabilizer bars 324 to fold rather than translate with the URHA 301.

During the transition from ground mode to flight mode, the first and second motors 108 and 110 are stopped and the transforming mechanism 200 is deployed to place the robot 100 in the position shown in FIG. 4A. The outer shaft 118 is then translated upwardly via actuation of the servo 130 as already discussed herein. As the outer shaft moves upwardly, it pushes the endcap 306 upwardly against the outer race 312b of the bearing 312. As the bearing 312 moves upwardly, it pushes the block 314 (via the washer 318) and thus the L-shaped brackets 322 and the URHA 301 upwardly. As the URHA 301 moves upwardly, it pulls the lower bearing 308, via the links 310, upwardly as well.

Further upward movement of the URHA 301 causes the mating portions 336 of the block 314 to engage the slots 334 of the collar 332, thereby rotationally fixing the URHA 301 to the collar (and therefore, to the inner shaft 116). As the block 314 moves upwardly, it also displaces the L-shaped brackets 314 and the arms 330, resulting in the movement of the stabilizer bars 324 to the position shown in FIGS. 5B-5C. Some minimal rotation of the pinions of the first motor 108 may ensure engagement of the pinion 142 with the third drive gear 140.

Upon energizing the second motor 110, the inner shaft 116, and thus the URHA 301, begins to rotate. As the URHA 301 rotates, the rotor blades 302a and 302b unfold as a result of the centrifugal force acting thereon.

The stabilizer bars 324 may provide a gyroscopic effect to dampen the system and, therefore, assist in maintaining vehicle stability during flight by tending to maintain the stabilizer's plane of rotation when perturbations are encountered. For example, air perturbations generally manifest as a tilt of the robot (pitch or roll). As this occurs, the stabilizer (e.g., the stabilizer bars 324) tries to maintain its plane of rotation even as the vehicle tilts. As this relative motion occurs, the arms 330 cause the upper rotor blades 302a 302b to alter their pitch cyclically (i.e., the pitch may vary throughout one revolution). The arms 330 and URHA 301 are designed such that when the stabilizer bars 324 tilt one way with respect to the robot 100, they cause their respectively upper rotor blade to pitch in a way that tends to attenuate the tilt and return the vehicle towards its original position.

In addition to this mechanical dampening, the robot 100 may include optional electronics to assist with flight stability. For instance, various accelerometers and gyroscopes may be provided, and their signals directed to a microcontroller, for six axis inertial measurement. The robot's receiver may also utilize an on-board computer such as an Overo Fire computer-on-module from Gumstix, Inc. of San Francisco, Calif., USA that communicates with an onboard microcontroller. The Overo may communicate wirelessly with a remote controller via WiFi or Bluetooth and may incorporate components to enable vision processing and/or streaming to a remote site from an onboard camera. These electronic systems may assist or replace the stabilizer bars 324. In the illustrated embodiment, the computer (diagrammatically represented as reference numeral 109 in FIG. 1) may be incorporated on a control circuit board as diagrammatically represented by reference numeral 105 in FIG. 1.

Once the URHA 301 is spinning, the first motor 108 may be energized to rotate the LRHA 303. By sequencing the start and stop times of the respective rotor head assemblies, the chance of upper rotor blades contacting lower rotor blades before full deployment is reduced. With both rotor head assemblies rotating (and the rotor blades extended) as shown in FIG. 2, the robot 100 is ready to take flight. By controlling the speeds of the respective motors 108 and 110, the lift on the robot may be controlled.

Figure 6:
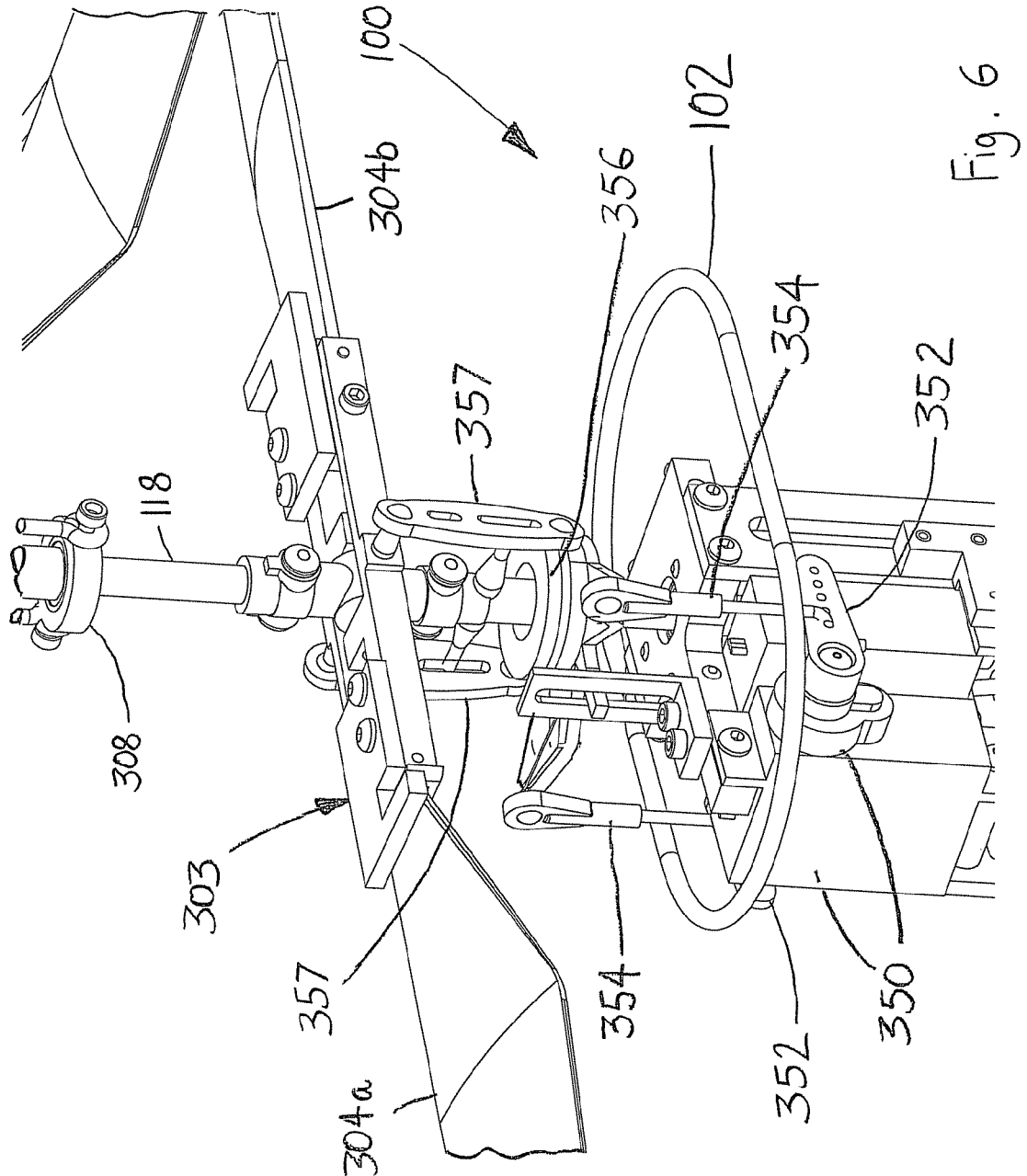
FIG. 6 is a perspective view illustrating a rotor pitch control system for the vehicle in accordance with one embodiment of the invention.

To change the pitch and roll of the robot (e.g., to control the direction of travel), one or more servos 350 may be provided as shown in FIG. 6. The servos 350 may be controlled to displace respective arms 352 that raise and lower links 354 attached to a swashplate 356. The swashplate 356, in turn, is coupled to the LRHA 303 by links 357. By controlling the servos 350, the pitch of the lower rotor blades 304a and 304b may be altered, resulting in a directional input to the robot. Yaw may be controlled by controlling the torque differential between the two rotor head assemblies.

Once the robot has flown over the intended obstacle/terrain (or has otherwise reached its destination), it may readjust the servos 350 and/or motors 108/110 to permit in-place hovering. This feature may be useful for robots 100 that are configured with a camera. Alternatively, the robot 100 may land at the destination. Once lowered onto the ground (e.g., onto the landing gear formed by the transforming mechanism 200 as shown in FIG. 2), the first motor 108 may be de-energized, at which point the lower rotor blades slow and collapse back against the body 102 of the robot 100. The second motor 110 may then be de-energized, wherein the upper rotor blades slow and also collapse against the body. The LRHA 303 may include hooks 305 (see, e.g., FIGS. 1 and 2). Once the two rotor head assemblies are de-energized, the URHA 301 may be momentarily energized in a reverse direction. As this occurs, the upper rotor blades 302a and 302b may engage with slots 307 formed in the hooks 305 to positively retain the upper rotor blades. This engagement may reduce the chance of the rotor blades interfering with the transition of the robot back to the ground transport mode. The servo 130 (see FIG. 4B) may then be actuated to retract the outer shaft 118, thereby disengaging the rotor head assemblies 301, 303 from the drive system.

Once the rotor blades are stopped and lying against the body 102, the transforming mechanism 200 may be actuated to return the robot to the ground mode. For instance, the spool 222 (see FIG. 3) may be rotated in the second direction 227 to retract the cable 224. As the cable is retracted, it pulls the biased member 214, the elongate member 212, and the tail 202 inwardly towards the body 102. The tail may then hold the lower rotor blades against the body 102 during operation in ground mode as described above.

In one embodiment, a 12 Volt (V) battery may be used. To accommodate lower voltage for some of the electronic components, switch-mode voltage regulators may be used. Alternatively or in addition, voltage reduction may be achieved with linear regulators.

Based upon an exemplary vehicle such as the vehicle 100 described herein (e.g., a vehicle incorporating the motors 108, 110, the transforming servo, flight control servos, a receiver, camera, microcontroller, and a computer (e.g., Overo unit described above)), it is estimated that power input (based upon the use of linear regulators) required to transport the vehicle in ground mode would be about 30 Watts (of which about 10 Watts (W) would be attributable to usage and 20 W attributable to losses). The same configuration operating in flight mode is estimated to require power input of about 86 W (of which about 71 W would be attributable to usage and 15 W attributable to losses). It is estimated that, with further design improvements including the use of switching regulators, these losses could be reduced substantially, e.g., to about 2 W or even less, in both operating modes.

These estimates illustrate the potential benefit of including the two locomotion modes on one robot: the energy usage while the robot is rolling is estimated to be approximately one-third (or one-seventh when excluding power losses) of that when it is flying. In other embodiments, where components are aggressively optimized, it is estimated that losses could further be reduced, giving the ground mode an even greater energy advantage. For this reason, it may be beneficial to make the ground mode as capable as possible at maneuvering in its expected mission environment. The flight mode could then be reserved for specific circumstances such as unexpected terrain or tall obstacles.

Figure 7A:
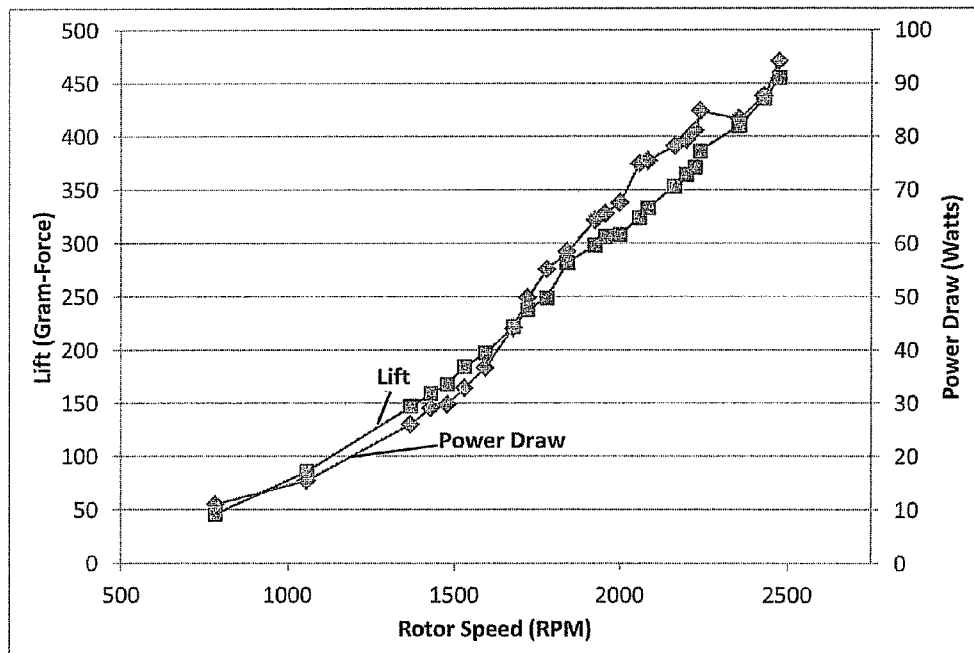

FIG. 7A shows a graph of lift and total power draw of an exemplary robot 100 as a function of rotor speed. It shows that the robot may require at least 65 W of power to the motors to take off and maintain a hover with no payload. This would allow the exemplary robot 100 to hover for about 4 minutes using a 730 mAh, 12 V battery. It also illustrates that the illustrative robot 100 is capable of taking on a payload of nearly 50% of its weight (though at the expense of maneuverability and runtime).

Figure 7B:
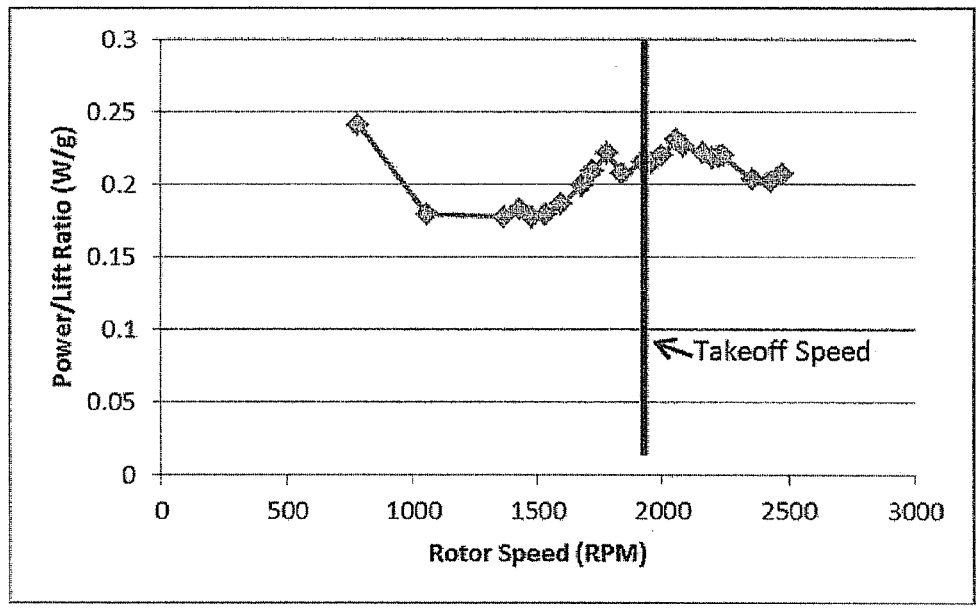

One metric that can be extracted from this data is the ratio of power draw to lift, shown in FIG. 7B. In the operating range of the exemplary robot (i.e., where the lift exceeds its mass), this ratio may be approximately 0.215+/−0.15 watts per gram-force when using non-folding rotor blades. This may be a conservative measurement as it is based upon a test robot using non-folding rotor blades, wherein the folding rotor blades illustrated herein use a slightly larger rotor diameter.

Test data for FIGS. 7A and 7B was collected with a test robot using a custom test stand created to test payload and to compare the performance of various flight system components. A load cell was placed near the bottom of the structure, attached to which was part of a robot frame having motors attached thereto. A load transmission shaft was connected through a bearing (used to dampen the vibrations that can sometimes occur due to unbalanced rotor blades) in the test stand top plate.

For payload testing, the lower wheel of the robot was removed and the load transmission shaft from the test stand was rigidly attached at the bottom of the robot, allowing the robot to pull on the load cell. For motor and/or rotor testing, the rotors were attached to the shaft directly above this upper plate and driven by motors attached to the robot frame. While this configuration may have resulted in some undesirable ground effects, it did permit the collection of data that may be useful for comparison purposes.

Exemplary Embodiments of FIGS. 8-24

FIGS. 8-24 illustrate a robotic vehicle 500 (also referred to herein as a "robot"), as well as some variations of the same, in accordance with yet another embodiment of the invention. Like the vehicle 100, the vehicle 500 may be capable of both a ground transport mode (i.e., "ground mode") and an aerial flight transport mode (i.e., "flight mode").

Figure 8:
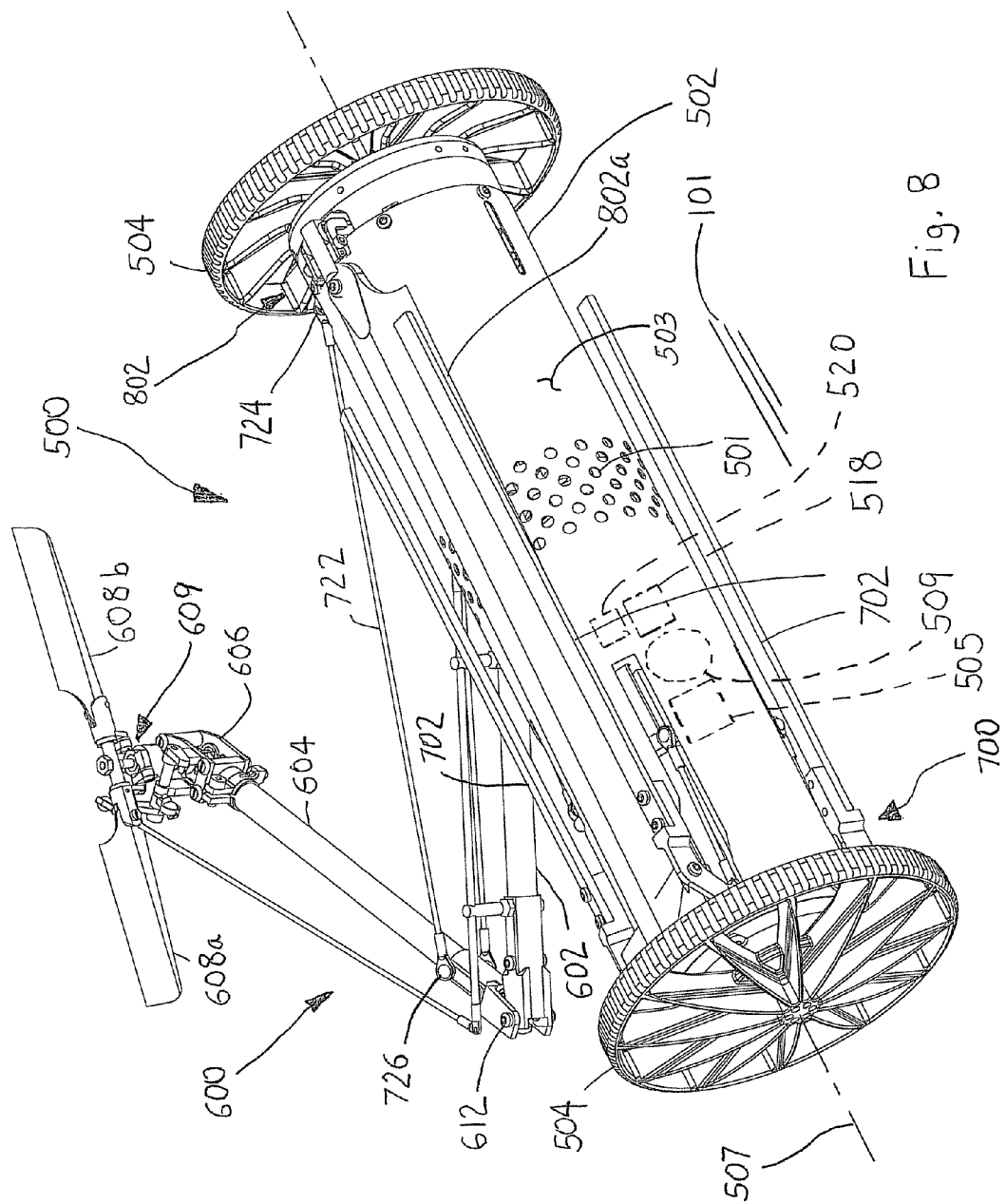
FIG. 8 is a perspective view of a robotic vehicle in accordance with another embodiment of the invention, the vehicle shown in a ground transport mode ("ground mode")

As shown in FIG. 8, the vehicle 500 may, once again, generally form a body, e.g., an elongate body 502, having an underlying structural chassis supported for rolling engagement with the reference (e.g., ground) surface 101 by one or more, e.g., two, wheels 504. While shown herein as using a generally elongate, cylindrically shaped body 502, this configuration is not limiting. Rather the body may have most any shape that can be supported for rolling engagement with the reference surface.

In the illustrated embodiment, the body 502 may be enclosed by a skin or covering 503, e.g., a tubular shell or a series of semi-cylindrical panels. In the illustrated embodiment, the covering 503 is formed by a flexible plastic sheet that is wrapped around the body and fastened thereto. The covering 503 may protect the various components of the robot, preferably without adding substantial weight. Where needed, various cutouts (e.g., perforations 501) may be provided in the covering. While not limited to any particular size, the vehicle 500 may, in one embodiment, have specifications as indicated in Table II (refer to description of Table I for definitions).

TABLE II

| Metric | Value |
|---|---|
| Wheel Track Width | 226 mm |
| Ground Mode Width | 250-260 mm |
| Ground Mode Height | 80-100 mm |
| Ground Mode Length | 200-210 mm |
| Rotor Diameter | 460-470 mm |
| Flight Mode Height | 270-280 mm |
| Battery | 1350 mAh 2-cell Lithium Polymer |
| Mass | 440-450 g |

However, as with the vehicle 100 described above, other sizes and configurations are certainly possible without departing from the scope of the invention.

Attached to the body, e.g., to each end of the elongate body 502 in the illustrated embodiment, is a powered ground engaging wheel 504 selectively rotatable (relative to the body) to propel the vehicle over the ground surface 101. Each wheel 504 may be configured to provide the desired ground mobility characteristics with minimal weight. For instance, the wheels are, in the illustrated embodiment, constructed as a plastic or rubber ring with a series of spokes to provide the necessary radial rigidity. Such a configuration provides the desired shock absorption without adversely limiting vehicle traction. The spokes of the wheels 504 may also present a curved face at the wheel end (see, e.g., FIG. 10) to reduce the chances of the vehicle 500 balancing on an end of one wheel (as could potentially occur when transitioning from flight mode back to ground mode). Once again, other wheel configurations are certainly possible without departing from the scope of the invention.

In the ground mode (see FIG. 8), independent motors (further described below), may power each of the wheels 504. To counteract the torque the wheels 504 may apply to the body 502, the vehicle 500 may also include a tail or tail assembly 600 extending outwardly from the body. The tail assembly 600 may include one or more boom sections 602 and 604 that extend away from the body 502 of the vehicle 500. A ground contact portion 606 may contact the ground surface 101 during operation in the ground mode and act to counter the wheel torque. As a result, the orientation of the robot may remain generally unchanged during ground mode operation. Once again, the speed and direction of each wheel 504 may be independently controlled to change speed and/or direction of the robot 100.

Unlike the vehicle 100, the vehicle 500 does not utilize counter-rotating rotors, opting instead to provide a tail rotor head assembly 609 ("TRHA") (e.g., located at or near a distal end of the tail assembly 600), as further described below, to oppose the torque of a powered, lift or main rotor head assembly ("MRHA") 801 of the vehicle 500 during flight mode. Moreover, the vehicle 500 may isolate the drive system of the ground mode from that of the flight mode. As a result, improved motor selection based upon the two drive modes (rather than based upon a compromise between the two) may be achieved.

Figure 9:
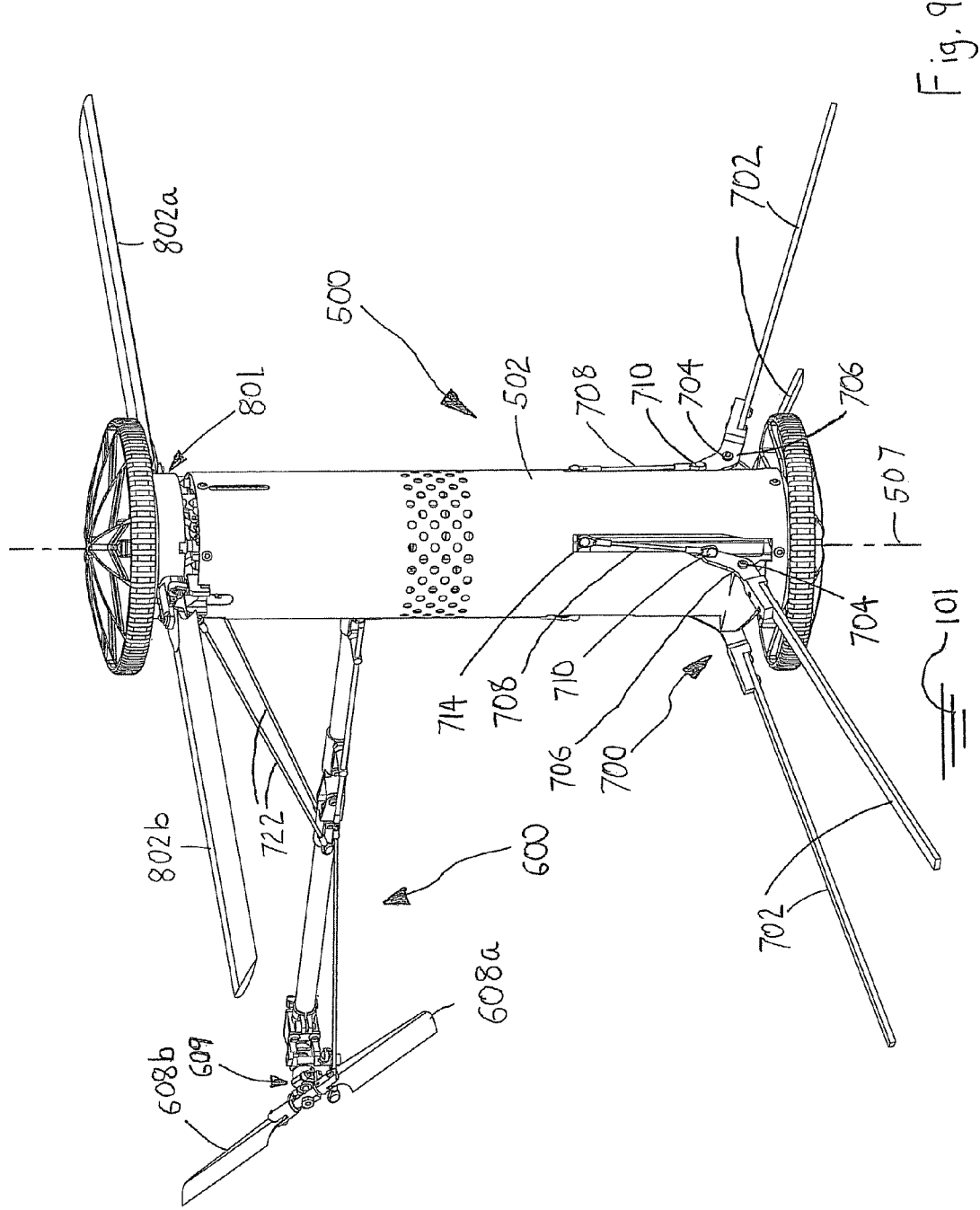
FIG. 9 is a perspective view of the vehicle of FIG. 8 after it has been reconfigured into a flight mode.

Like the vehicle 100, the vehicle 500 may be reconfigured from the ground mode of FIG. 8 (wherein the wheels are in contact with the ground surface 101) to an air or flight mode as shown in FIG. 9 (wherein one or both wheels are elevated above the ground surface). The transition between the ground mode and the flight mode may again be the result of a transforming mechanism 700 attached to the body and operable as further explained below. In the flight mode, the body 502 is set on end so that the MRHA 801, which is attached for rotation to the body at or near an upper end, may be deployed. Once deployed and energized, the MRHA 801, which is attached to the body as described below, may be driven to generate sufficient lift to permit rotary wing flight. The transforming mechanism 700, in addition to orienting the vehicle 500 for flight, may further move the tail assembly 600 between a first position shown in FIG. 8 (ground mode) and a second position shown in FIG. 9 (flight mode). Once again, in the ground mode, a longitudinal or wheel axis 507 of the vehicle may be generally parallel to the ground surface 101 as shown in FIG. 8. However, upon reaching the flight mode as shown in FIG. 9, the axis may intersect the ground surface, e.g., the wheel axis when in flight mode may be generally orthogonal to the wheel axis when in the ground mode.

In the illustrated embodiment, the torque of the MRHA 801 is countered by the TRHA 609 (i.e., the TRHA 609 provides a force vector, in combination with the length of the tail assembly acting as a lever arm, that counters the torque of the MRHA). Each rotor head assembly may include a rotor having one or more, e.g., two, rotor blades (main or lift rotor blades 802a and 802b; and tail rotor blades 608a and 608b) as further described below. In this manner, the flight mode is similar in concept to a helicopter. In one embodiment, the MRHA 801 and related structure is based upon the commercially available radio controlled helicopter model Hurricane 200 V2 RC Helicopter distributed by Gaui Hobby Corp. of Taiwan, R.O.C. However, other embodiments may certainly tailor the MRHA to optimize performance for the intended use.

As FIG. 8 illustrates, at least the blades 802a, 802b of the MRHA 801 may be stowed during ground mode. In the stowed position, the blades 802a, 802b may collapse or fold to be near or even lie against the body, e.g., they may extend along an outer surface of the body 502 as shown in FIG. 8. Such a construction allows the rotor blades to be deployed (e.g., moved to a large diameter, deployed position in the flight mode, wherein the blades extend away from the body, e.g., are generally orthogonal to a longitudinal or rotor axis 507 of the vehicle), but collapsed within a much smaller volume when in the ground mode. In the illustrated embodiment, folding is accomplished by a biased, active hinge as further explained below.

In the ground mode (see FIG. 8), the assembly 600 may be held stationary such that a lower distal portion (e.g., the portion 606) rests against the ground surface 101 to orient the body 502 of the vehicle 500 about its longitudinal axis 507 (which may, in the illustrated embodiment, be synonymous/coincident with both the wheel axis and the main rotor axis). As a result, a payload 509 (such as a camera or other sensor) may be secured to the vehicle 500 such that it may remain consistently oriented in the desired direction. Once again, the vehicle may incorporate various electronics, e.g., control circuit board 505, a wireless transmitter and/or receiver 520, and/or an onboard computer 518 (e.g., the Gumstix computer-on-module device identified above with reference to the vehicle 100), each represented diagrammatically in FIG. 8.

In the illustrated embodiment, the center of gravity (during both ground mode and flight mode operation) may be located at a position within the body 502 but offset radially from the longitudinal axis 507 in a direction towards the tail assembly 600. Accordingly, unlike the vehicle 100, the tail assembly 600 of the vehicle 500 need only counter wheel torque in a single direction. However, in other embodiments, it is contemplated that the tail assembly 600 could completely fold against the body 502. In such an embodiment, a ground mode-only tail could then extend from the body, e.g., from a side opposite the tail assembly. Such a configuration may allow the center of gravity to move from a location that is further toward the ground mode-only tail when in ground mode, to a location more near the longitudinal axis when in flight mode.

With this general overview, the components and operation of an exemplary embodiment of the invention will now be described. While such an embodiment is described in detail below, the description is nonetheless illustrative and other embodiments are certainly possible without departing from the scope of the invention.

FIG. 10 illustrates the vehicle 500 as configured in ground mode. However, to assist with the description, this and many of the subsequent views (regardless of the operating mode) assume that the vehicle is set on end (i.e., on the first or lower wheel 504a as shown in FIG. 10). As a result, this view is identified as a side elevation view rather than a top plan view (which would appear identical). Moreover, to better describe and illustrate the vehicle 500, FIG. 10 and many of the remaining figures are provided with the covering 503 and various additional structure removed. Finally, to avoid blocking visibility of internal components, one of the rotor blades 802a and 802b (see FIG. 9) is removed in FIG. 10 and the other blade is mostly hidden by the body 502.

In the illustrated embodiment, the chassis of the body 502 may be formed by a series of elongate rods 508 (six rods in the illustrated embodiment) extending between a first or lower chassis plate 510 and a second or upper chassis plate 512 as shown in FIG. 10. To increase the structural integrity of the body 502, the vehicle 500 may include additional intermediate plates 514 as needed. The lower and upper chassis plates 510 and 512 and the intermediate plates 514 may be secured to the rods 508 in most any acceptable fashion. For instance, the rods may threadably engage with the lower plate 510 and fasten to the upper plate 512, while the intermediate plates may be secured with snap rings 516 (see also FIG. 11B) attached to grooves formed in the rods 508.

The intermediate plates 514 may also spatially separate system electronics from the mechanical components of the vehicle 500. For instance, the space defined by the plates 514 may contain the circuit board 505, computer 518, wireless transmitter/receiver or receiver 520, and the payload (e.g., camera 509). In one embodiment, the receiver 520 may be configured as two separate model AR6300 RC receivers from Spektrum/Horizon Hobby, Inc. of Champaign, Ill., USA, wherein one is used for ground mode and another for flight mode.

Each of the wheels 504 (e.g., lower wheel 504a and upper wheel 504b) may be driven by a separate wheel motor 522 retained by the body 502. For example, a first or lower wheel motor 522a may be used to drive the lower wheel 504a, while a second or upper wheel motor 522b may be used to drive the upper wheel 504b. In one embodiment, the motors may both be model 816 003 S motors mated with a model 8/2K 51.2:1 gearhead, both from Micromo of Clearwater, Fla., USA. The motors may, in one embodiment, be powered beyond their intended 3 V input, e.g., to about 7-8.5 V, to achieve the desired performance.

Figure 11A:
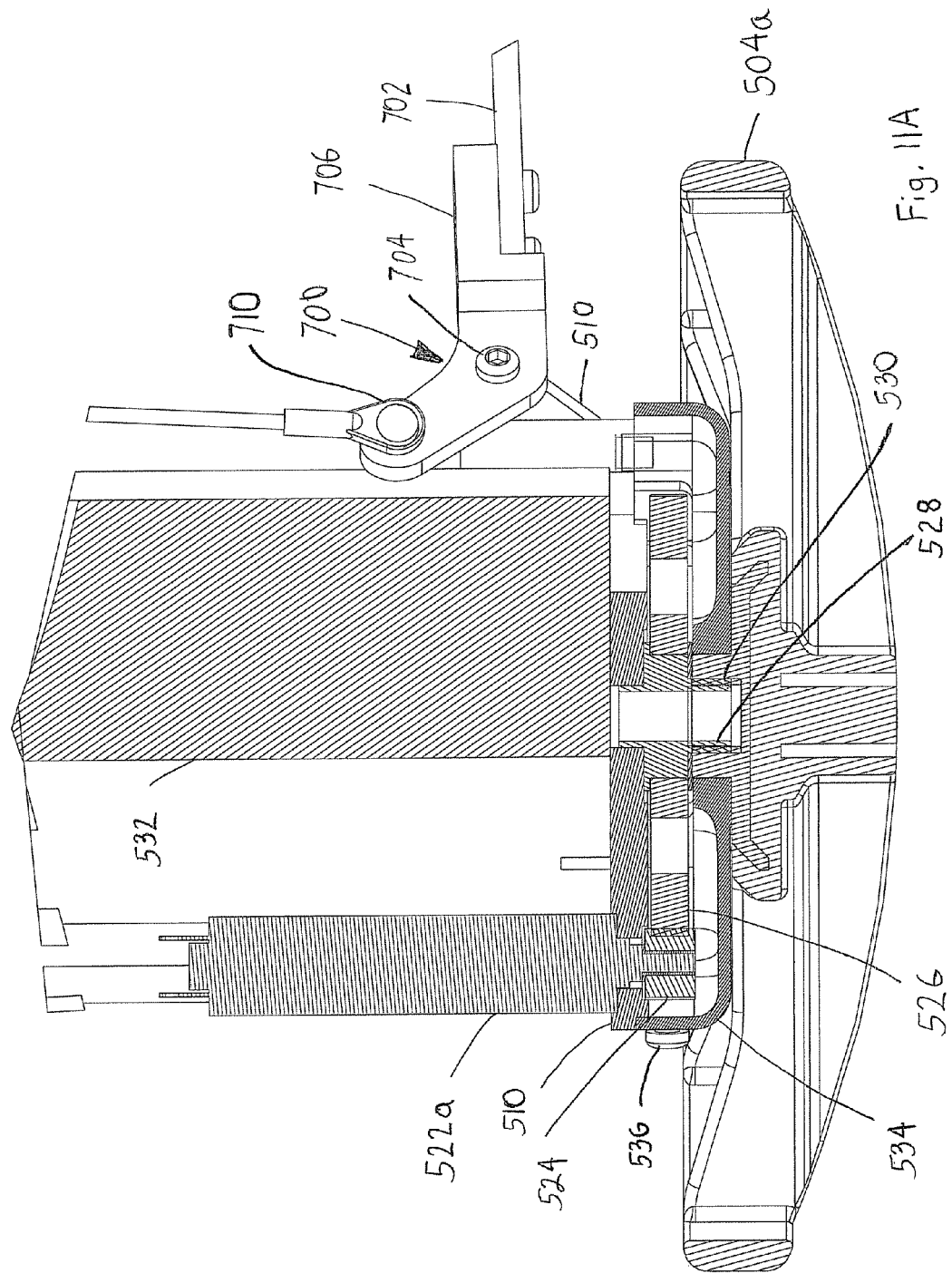

As shown in FIGS. 11A-11B, the lower wheel motor 522a may attach, e.g., via fasteners or the like, to the lower chassis plate 510. A pinion 524 may be fixed to an output shaft of the lower wheel motor 522a such that, when the motor is energized, the pinion rotates at a controlled speed. The pinion 524 may mesh with outer edge of a gear 526, the latter of which includes a central drive shaft 528 that is mechanically engaged, e.g., threaded, to a hub 530 of the wheel 504a. As a result, rotation of the pinion 524 results in corresponding rotation of the wheel 504a.

Also attached to the lower chassis plate 510 is a battery 532. The battery 532 may provide power to all onboard electrical systems including the motors 522, as well as the payload 509 and onboard electronics. In one embodiment, the battery is a model TP1350-2S from Thunder Power RC of Las Vegas, Nev., USA.

As shown in the section view of FIG. 11A, a lower endcap 534 may surround an outer face of the lower chassis plate 510 to, for example, enclose the pinion 524 and wheel gear 526 during operation, and to form a bearing surface for the wheel hub 530. FIG. 11B provides a perspective view of the lower wheel drive system with the wheel 504/wheel hub 530 removed. As shown in this view, standoffs 535 may be used to position the lower endcap 534 and provide clearance for the moving gears, while one or more threaded fasteners 537 may secure the endcap in place.

Figure 11C:
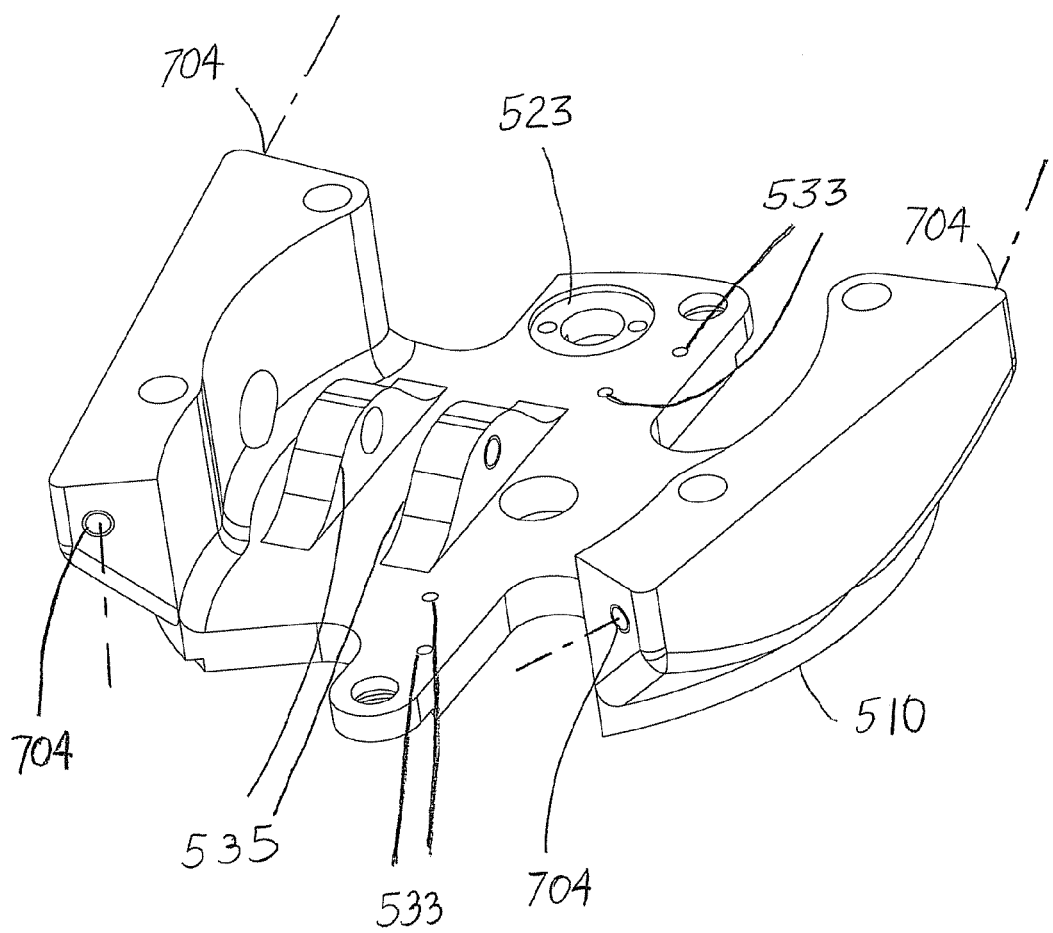

FIG. 11C is a perspective view of the lower chassis plate 510. This view illustrates mounting features 523 for the wheel motor 522a, as well as mounting features 533 for the battery 532. Other features of the lower chassis plate are described in more detail below.

FIG. 12 illustrates a perspective view of the upper end of the vehicle 500 with various structure (e.g., covering 503, swashplate connecting links) removed. As can be seen in this view, the upper wheel 504b may be identical to the lower wheel, e.g., it may have a wheel hub attached to a central drive shaft 528. The central drive shaft may, once again, be attached to a gear 526 that meshes with a pinion 524. Similarly, the wheel motor 522b may be secured to the body 502 such that its output shaft extends upwardly towards the pinion 524. However, while the drive system of the lower wheel 504a and motor 522a remains fixed relative to the body 502 as the vehicle 500 transitions between the ground mode (FIG. 8) and the flight mode (FIG. 9), the drive system of the upper wheel 504b is configured for relative axial movement as further described below. As a result, the output shaft of the upper wheel motor 522b may, instead of attaching directly to the pinion 524, attach to a dog clutch 538 interposed between the output shaft of the motor 522b and the pinion 524 of the upper wheel drive system. The dog clutch may provide selective mechanical interconnection of the upper wheel motor 522b with the upper wheel 504b.

Figure 19:
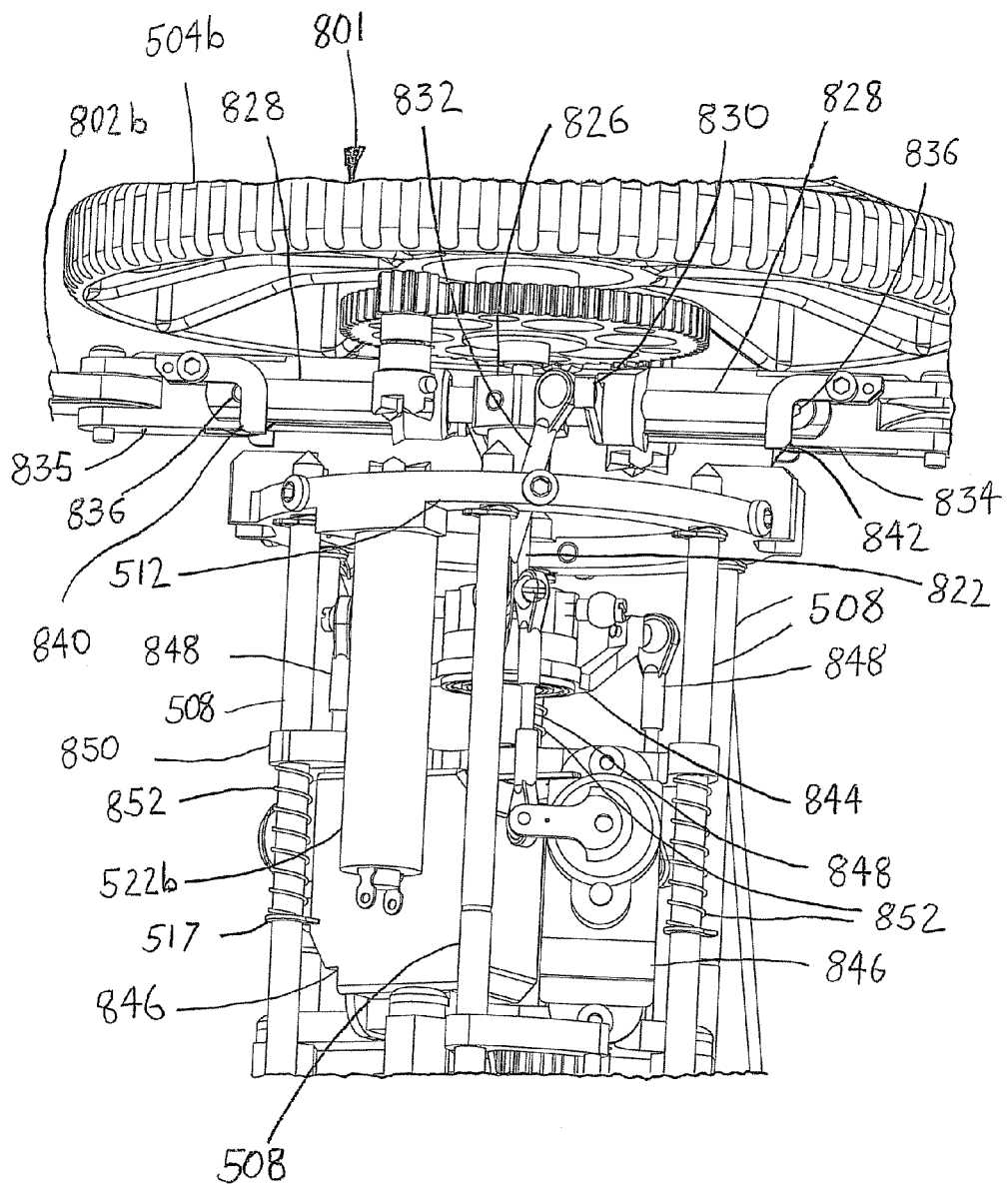
FIG. 19 is an enlarged perspective view of the MRHA of FIG. 17.

Specifically, during transition from the ground mode to the flight mode, the upper end of the vehicle 500, (e.g., the MRHA 801) may axially move away from the body 502 from a first position (see FIG. 8) to a second position (see FIG. 9). To accommodate this motion, a pinion portion 542 of the dog clutch 538 may axially separate from a motor portion 540. When the pinion portion 542 and the motor portion 540 of the dog clutch 538 are mechanically coupled (as is the case when the vehicle is in ground mode as shown in FIG. 12), rotation of the output shaft of the wheel motor 522b results in corresponding rotation of the pinion and thus the upper wheel 504b. However, when the pinion portion 542 is axially separated from the motor portion 540 (as is the case when the vehicle is in flight mode as shown in FIG. 19), the upper wheel 504b is effectively disconnected from the upper wheel motor 522b. Axial movement of the dog clutch halves towards one another again will result in mechanical engagement of the pinion portion 542 with the motor portion 540, once again permitting power delivery to the wheel 504b. In the illustrated embodiment, at least two pinions 524, each with a dog clutch pinion portion 542, may be provided as shown in FIG. 12 to accommodate multiple (e.g., two) MRHA 801 positions.

During operation in ground mode (see, e.g., FIG. 8), the vehicle 500 (like the vehicle 100) may be propelled and directed by independent and variable rotation of each of the wheels 504. Again, this may be via autonomous or semi-autonomous control, remote control, or combinations thereof. In the illustrated embodiment, the variable power may be delivered to each of the drive wheel motors 522a, 522b by the battery 532 (see, e.g., FIG. 11A) to propel the vehicle 500 over the ground surface 101. Once again, to counteract the torque resulting from wheel rotation, the ground contact portion 606 of the tail assembly 600 may rest upon the ground surface 101. Thus in the ground mode, the vehicle 500 may operate in a manner similar to the vehicles described and illustrated in U.S. Pat. No. 6,548,982.

To transform the vehicle 500 from the ground mode of FIG. 8 to the flight mode of FIG. 9, the illustrative transforming mechanism 700 may be utilized. FIG. 13, once again, illustrates the vehicle 500 in ground mode. For convenience, various structure (e.g., portions of the tail assembly 600, the body covering 503, and the forward rotor blade 802a) are removed from this and some subsequent views.

To reconfigure the vehicle 500 from the ground mode to the flight mode, the transforming mechanism 700 (see also FIG. 9) may be provided. The transforming mechanism 700 may assist not only with transitioning the vehicle 500 between the ground and flight modes, it may also provide a landing gear of a size sufficient to provide stability to the vehicle during take-off and landing.

Figure 13:
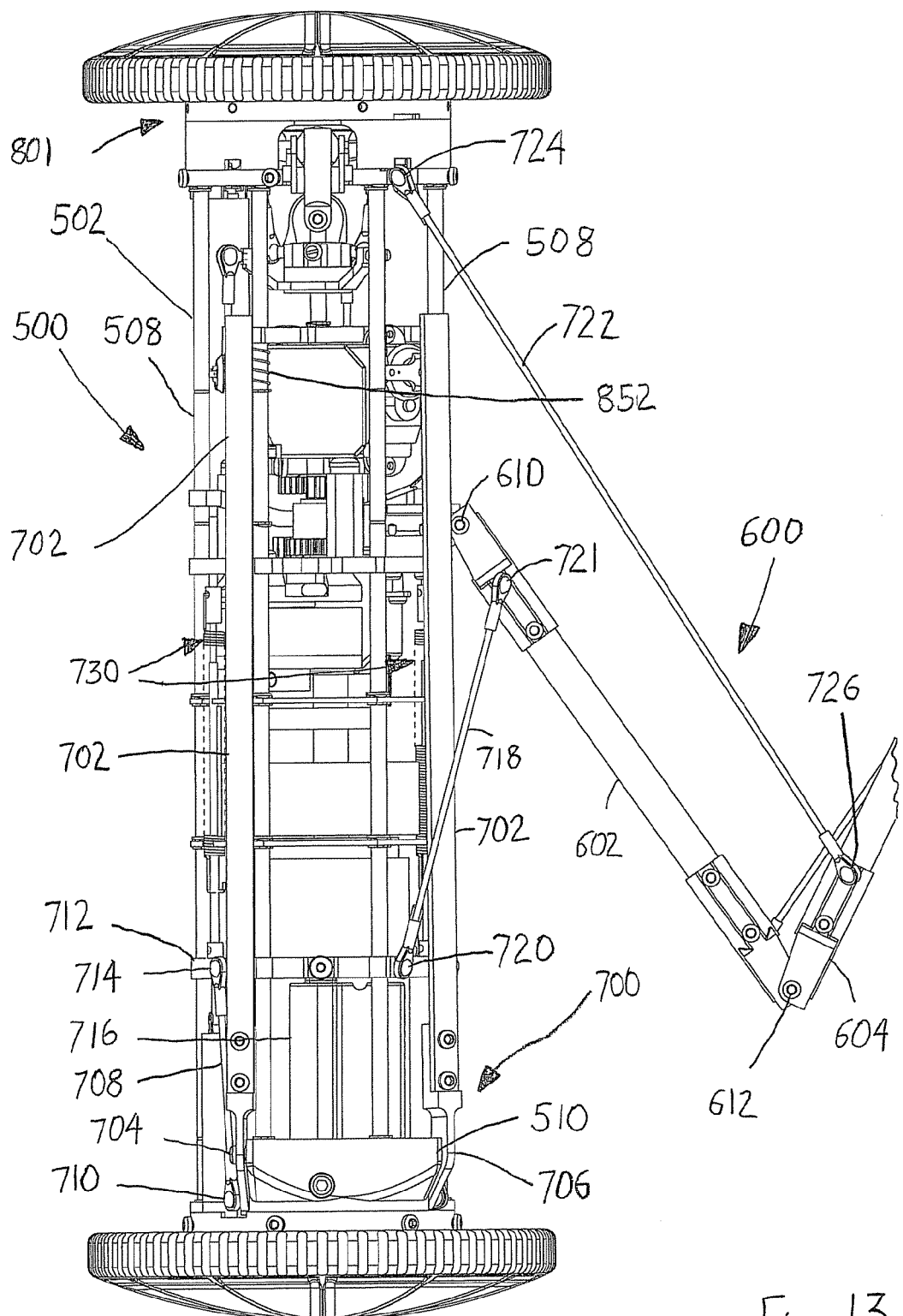
FIG. 13 is a partial side elevation view of the vehicle of FIG. 8 (in the ground mode) with various structure removed for clarity, the vehicle shown rotated such that its longitudinal axis is vertical.
Figure 14:
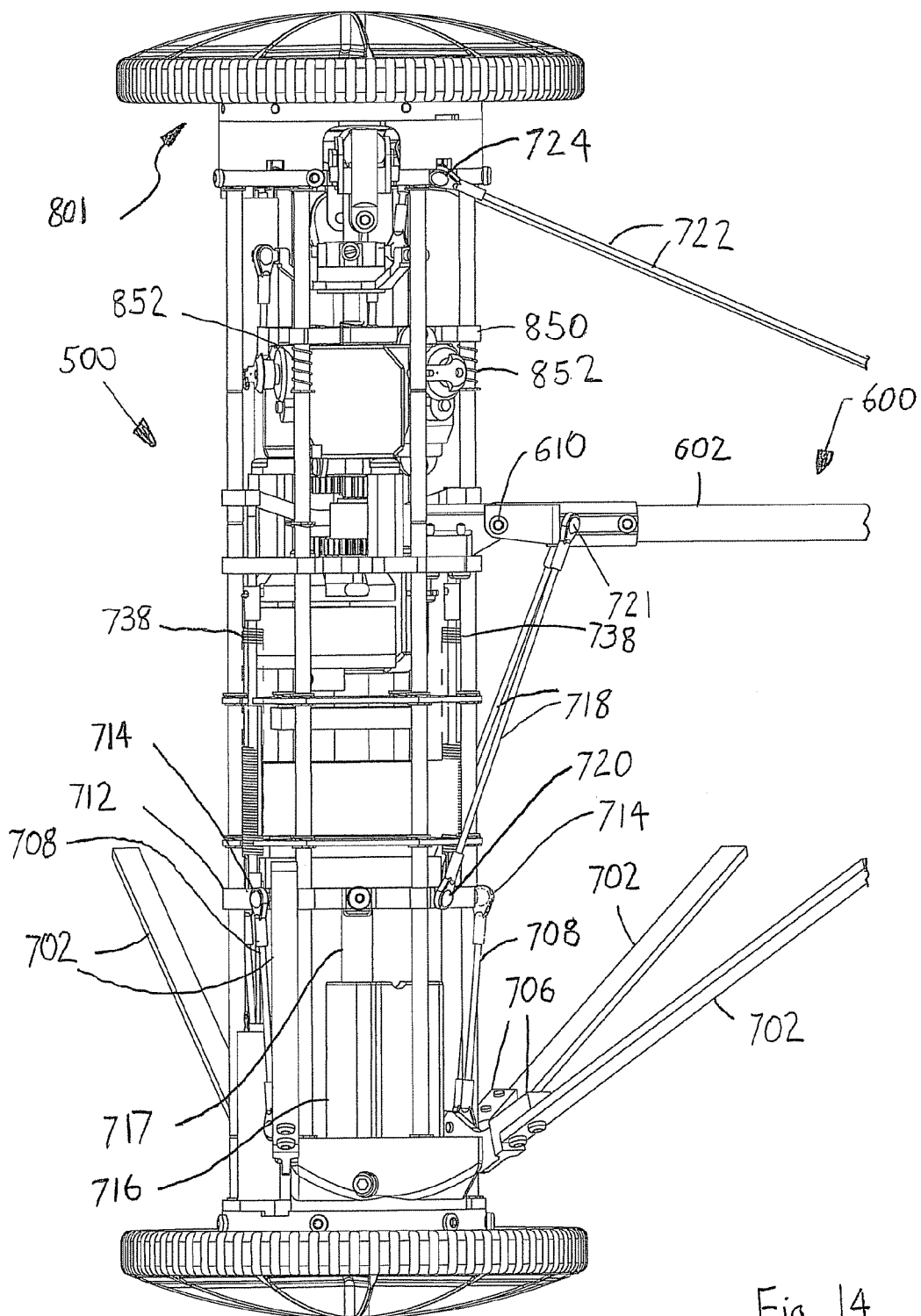
FIG. 14 is view similar to FIG. 13, but with the vehicle illustrated as it transitions from ground mode to flight mode.

The mechanism 700 will be described primarily with reference to FIGS. 13-15, wherein FIG. 13 shows the mechanism 700 when the vehicle 500 is in ground mode; FIG. 14 illustrates the mechanism during transformation between ground and flight modes; and FIG. 15 illustrates the mechanism after the vehicle has reached flight mode.

As shown in the figures, the mechanism 700 may include members or legs 702 that are pivotally attached to the body 502, e.g., to ears formed on the lower chassis plate 510, at pivots 704 (see also FIGS. 9 and 11A). The legs may selectively contact the ground surface 101 to reposition the body 502 as described below. While only two legs are visible in FIG. 13, the vehicle 500 may include two or more (e.g., a total of four in the illustrated embodiment) legs as shown in FIG. 9. The four legs may, at the point of contact with the ground surface 101, define a landing footprint of sufficient size to stabilize the vehicle 500 during landing/take-off. In other embodiments, two legs may be provided and, in conjunction with the lower wheel 504a, provide tripod-like support for the vehicle during landing/take-off.

In the illustrated embodiment, each of the legs 702 may include (e.g., fasten to) a bellcrank or lever arm 706 which attaches to the lower chassis plate 510 at the pivots 704. Each of the lever arms may then attach to a rod 708 via a lever pivot 710 (see also FIGS. 9 and 11A-11C). A second or opposite end of each rod 708 may then pivotably attach, via a pivot 714, to a slider plate 712. The slider plate 712 may be operable to translate or slide along the elongate rods 508 of the vehicle body 502 as further described below.

Figure 15:
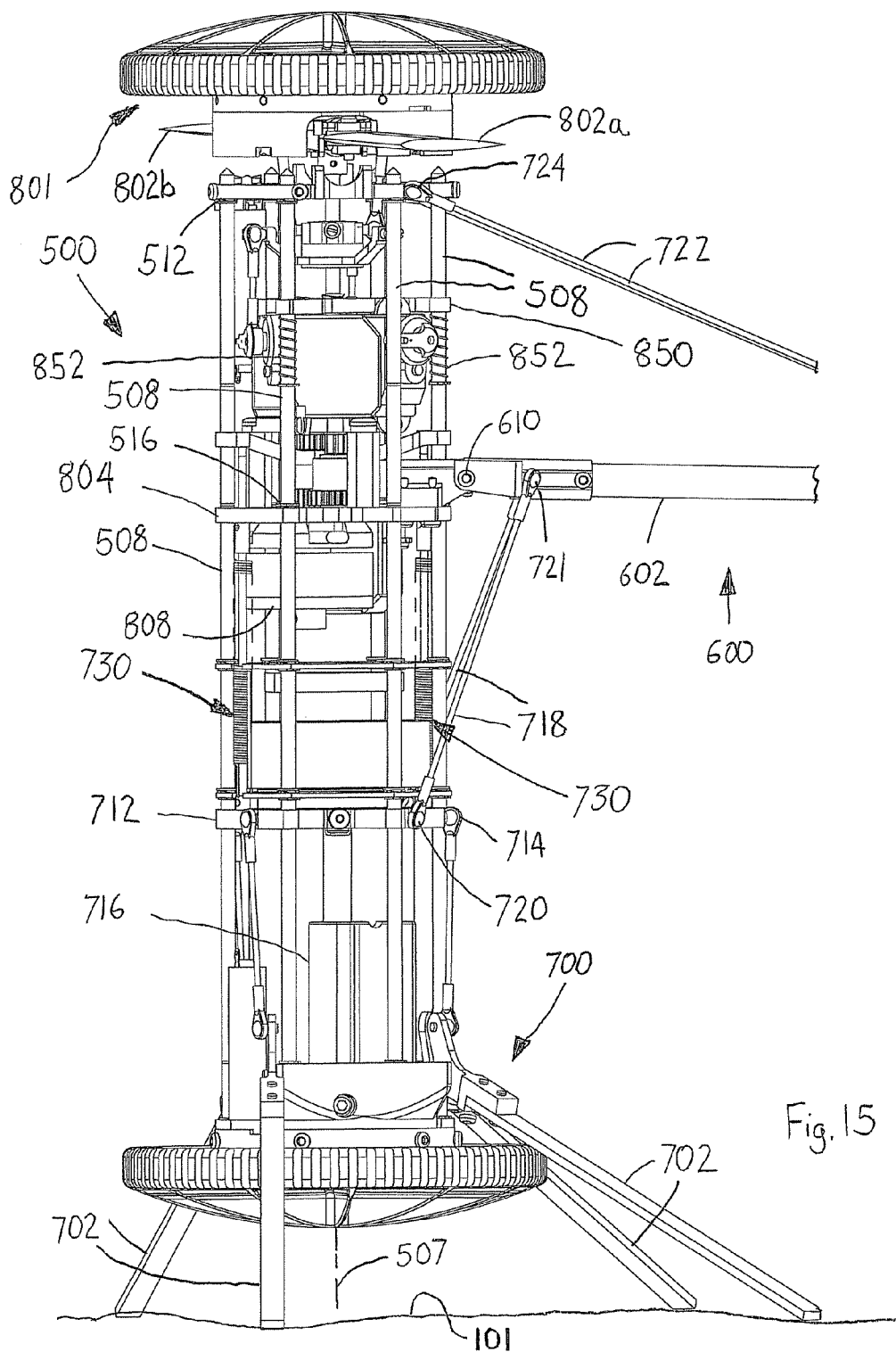
FIG. 15 is a view similar to FIG. 13, but illustrating the vehicle after it has transitioned to flight mode.

To manipulate the mechanism 700 from the ground mode of FIGS. 8 and 13 to the flight mode of FIGS. 9 and 15, an actuator, e.g., an electric linear actuator 716, may be provided. The actuator 716 may have its base or lower end mounted to lugs 535 formed in the lower chassis plate 510 (see, e.g., FIG. 11C), and its upper or actuator rod end 717 (see FIG. 14) attached to the slider plate 712 such that the actuator is displaceable in a direction parallel to the longitudinal axis 507. In the illustrated embodiment, the ends of the actuator 716 are attached via pivotal connections or spherical (e.g., ball-and-socket) rod ends to eliminate undesirable transverse loading of the actuator. In one embodiment, the actuator is a model PQ12-100-6-P from Firgelli Technologies Inc. of Victoria, BC, Canada.

In addition to deploying the legs 702, the mechanism 700 may also manipulate the tail assembly 600 between a first position in the ground mode (FIGS. 8 and 13) and a second position in the flight mode (FIGS. 9 and 15). As shown in FIGS. 8 and 13, the tail assembly may include both the first boom section 602, which includes a first or proximal end pivotally connected to the body 502 at a body pivot 610, and a second boom section 604 having a first end pivotally connected to a second end of the first boom section at a boom pivot 612. The TRHA 609 may be supported at or near a second, distal end of the second boom section 604 as shown in the figures.

To effect movement of the tail assembly 600 between the ground and flight modes, two rods 718 (only one visible in FIG. 13) may be provided. Each rod 718 may have a first end pivotally connected to the slider plate 712 at a pivot 720, and a second end pivotally connected to the tail assembly, e.g., to the first boom section, at a pivot 721. Two additional rods 722 (only one visible in FIG. 13, but see also FIG. 9) may also be provided. Each rod 722 may have a first end pivotally connected to the upper chassis plate at a pivot 724, and a second end pivotally connected to the tail assembly 600, e.g., to the second boom section 604, at a pivot 726.

While not wishing to be bound to any particular construction, the rods 708, 718, and 722 may, in one embodiment, be carbon fiber rods with nylon end fittings. These rods provide sufficient rigidity to achieve their intended function while maintaining minimal weight. Moreover, the end fittings of these rods, like many others described and illustrated herein, may be configured as spherical (ball-and-socket) rod ends to permit out of plane movement of the various components.

As one can thus appreciate, upward movement of the slider plate 712 also causes movement of the rods 718. As the rods 718 push upwardly against the first boom section 602, it causes the boom to pivot (counterclockwise in FIG. 14) about the body pivot 610. Moreover, as the first boom section 602 is displaced, the rods 722 constrain the movement of the second boom section 604. Once the actuator 716 is fully extended, the first and second boom sections are aligned as generally shown in FIG. 9. Moreover, as further described below, once the actuator 716 is fully extended, the legs 702 may extend longitudinally outwardly beyond the lower wheel 504a such that the legs may support the vehicle upon the ground surface 101 as indicated in FIG. 15.

In addition to leg 702 and tail assembly 600 deployment, the transition to flight mode may also include deployment of the MRHA 801, e.g., the rotor blades 802. With continued reference to FIGS. 13-15 and subsequent figures, the relationship between the body 502, transforming mechanism 700, tail assembly 600, and the MRHA 801 will now be described.

The transforming mechanism 700 may include at least one (e.g., two) axial force member, e.g., push/pull rod assembly 730. To better illustrate the push/pull rod assembly 730, a partial exploded view is provided in FIG. 16. In the illustrated embodiment, each of the two assemblies 730 may include a first or lower rod 732 having a first end 734 fixed to the slider plate 712. The rod 732 may protrude upwardly to a second end 736 that may pass first through an extension spring 738 and then enter an elongate passageway 740 formed within a second end 742 of a second or upper rod 744. Both the upper and lower rods 732, 744 may also include a feature, e.g., an opening 746, to receive and retain a hook end of the spring 738.

As a result of this construction, the assembly 730 may be extended to a length wherein the second end 736 of the lower rod 732 is withdrawn from the passageway 740 of the upper rod 744. However, the biasing force of the spring 738 may pull the two rods towards one another and keep them generally aligned. When withdrawn from direct contact, the two rods 732, 744 may move independently of one another as guided by the spring 738. However, once the second end 736 of the lower rod 732 approaches the second end 742 of the upper rod 744, the spring 738 may guide the second end 736 into the passageway 740. The lower rod 732 may continue to move independently of the upper rod 744 until the second end 736 bottoms out against an inner surface of the passageway 740. Once this contact occurs, the two rods move in unison.

Figure 16:
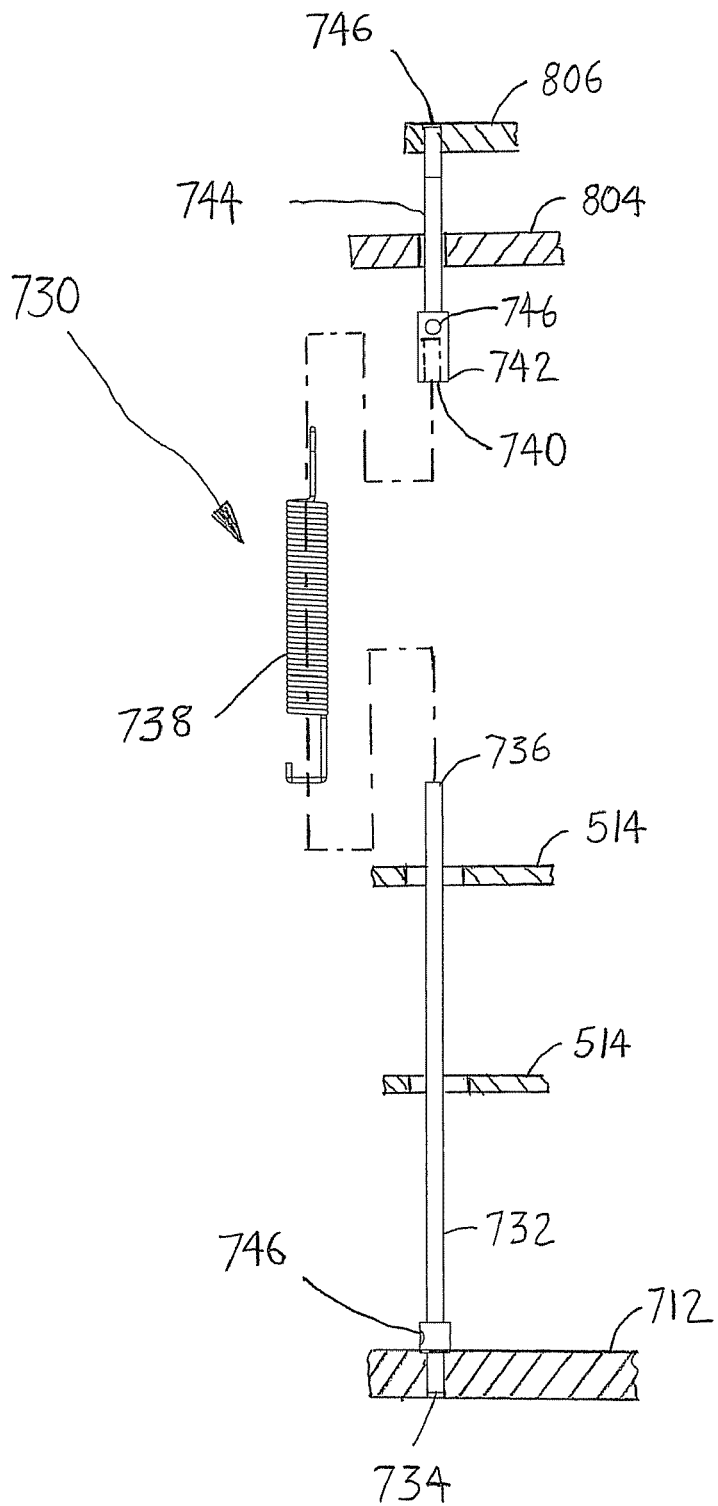
FIG. 16 is an exploded perspective view of an exemplary push/pull rod assembly of the vehicle of FIGS. 13-15.

As indicated in FIG. 16, each push/pull assembly 730 (including the spring 738) may pass with clearance through the intermediate plates 514. Moreover, a smaller upper body section of the upper rod 744 may move with clearance through a rotor motor support plate 804 as indicated. However, a first or upper end 746 of the upper rod 744 may be fixedly attached to a rotor locking member 806.

Figure 17:
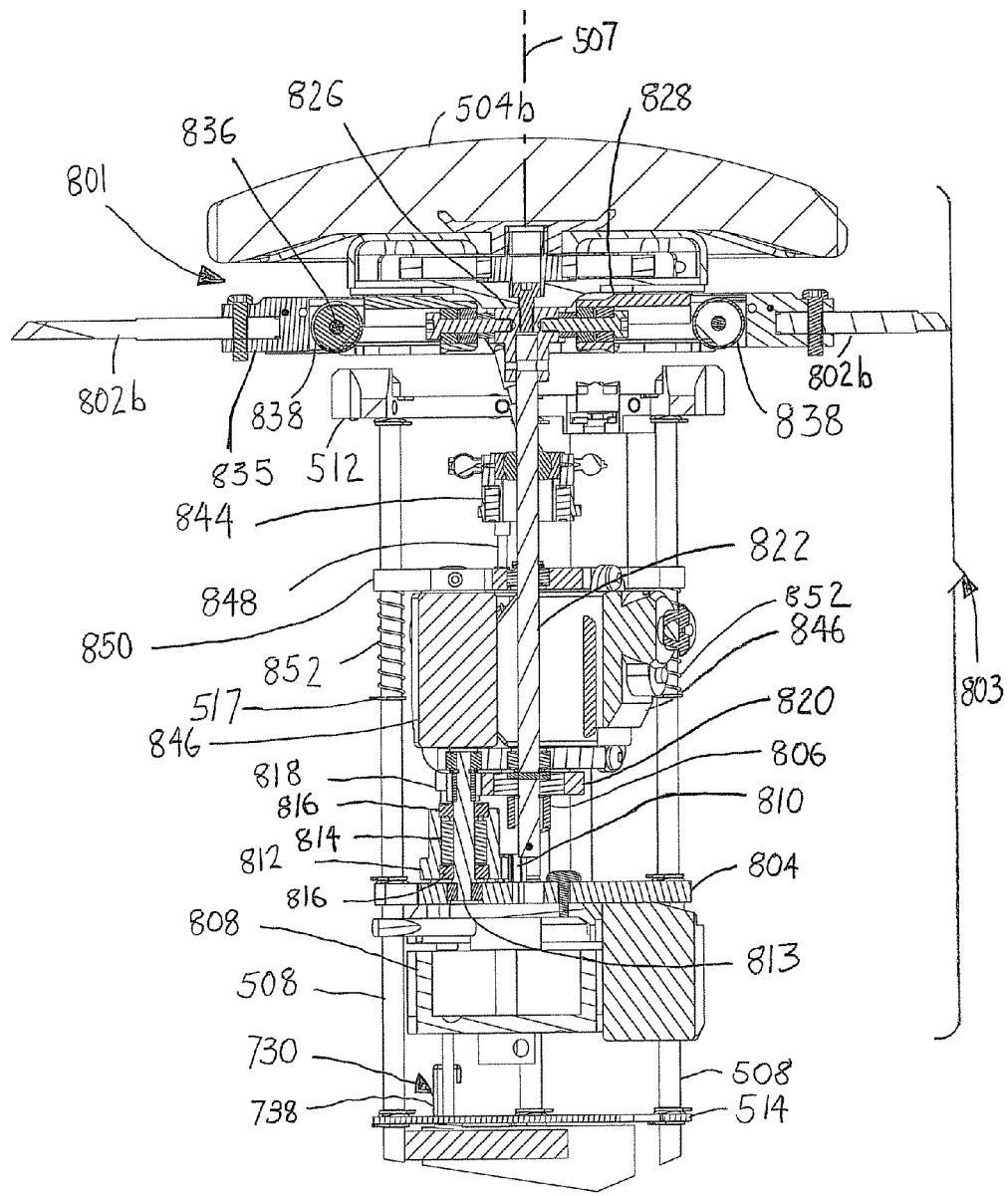
FIG. 17 is a partial section view of an exemplary lift or main rotor head assembly (MRHA) and rotor sub-chassis of the vehicle of FIGS. 13-15, the MRHA shown after moving from a first position (see FIG. 13) to a second position.
Figure 18:
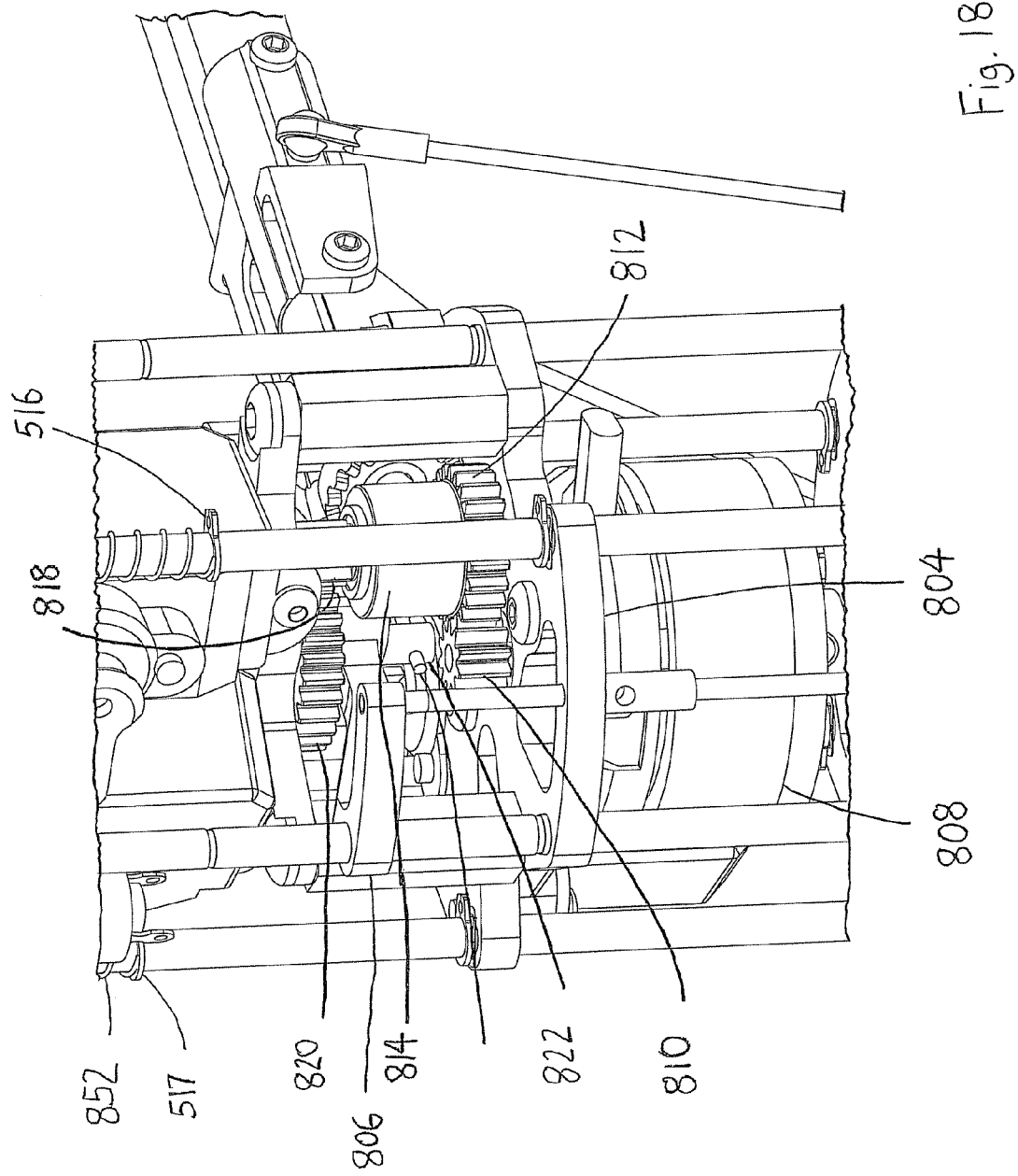
FIG. 18 is an enlarged perspective view of a portion of a lift rotor drive system.

Referring now to FIGS. 17 and 18, attached to a lower side of the rotor motor support plate 804 is a rotor motor 808. In one embodiment, the rotor motor is a model HK2206-5300 KV brushless motor distributed by Scorpion Power System LTD, of Hong Kong. However, other motors may certainly be used without departing from the scope of the invention. The motor 808 may include an output shaft that extends upwardly through the support plate 804 where it is fixed to a pinion 810 (partially hidden in FIG. 17, but visible in FIG. 18). The pinion drives a gear 812 containing a one-way bearing 814 that is in contact with a shaft 813. In one embodiment, one or more roller bearings 816 may also be included with the gear 812 as indicated in FIG. 17.

Located near an upper side of the one-way bearing 814 is a second pinion 818 keyed to the shaft 813. When the motor 808 is energized and driven, the one-way bearing 814 may rotationally lock the gear 812 to the shaft 813 to allow the gear 812, the shaft 813, and the second pinion 818 to rotate together in a first direction. As shown in FIG. 17, the pinion 818 may mesh with a second gear 820 that is keyed to a rotor shaft 822, an upper end of which is keyed to the MRHA 801. As a result, powering the motor 808 may rotate the MRHA 801 in the desired direction for flight. However, in the event that a torque (e.g., an external force) is applied to the drive system at a point "downstream" of the one-way bearing 814 (e.g., applied at the pinion 818, rotor shaft 822, or MRHA 801), the shaft 813 may be permitted to rotate freely with respect to the gear 812, thereby imparting no torque/motion to the gear 812 or the pinion 810.

With reference to FIGS. 17 and 19, the rotor shaft 822 may extend upwardly through two roller bearings and attach to the MRHA 801 that includes the rotor blades 802a, 802b. Fixed to an upper end of the rotor shaft 822 is a cap 826. The cap 826 may include mounting provisions for receiving two diametrically opposed rotor blade mounts 828 that, in the illustrated embodiment, are pivotable about an axis orthogonal to the axis 507 of the rotor shaft 822 (e.g., pivotable about an elongate axis of the rotor blades). By allowing the blade mounts to pivot about such an axis, the rotor blades 802 may be able to change pitch during flight operations. In one embodiment, changing the pitch of the rotor blades is accomplished by providing a lever arm 830 on each blade mount 828. Spherical rod end tie rods 832 (not shown in FIG. 17 and only one shown in FIG. 19) may then connect the lever arms 830 to a variable swashplate 844 as further described below.

Each blade mount 828 may form a clevis to receive a mating tang 834 of a blade adapter 835. The clevis and tang 834 may be connected via a pin 836 such that the blade adapter 835 may pivot relative to the clevis about an axis of the pin. Moreover, in the illustrated embodiment, a biasing member, e.g., torsion spring 838 (see FIG. 17), is attached about each pin to bias each tang 834 (and thus the attached rotor blades 802a, 802b) to their deployed position. While the blade adapter 835 could be formed as part of the rotor blade, it is, in the illustrated embodiment, a separate component that may be fastened to the rotor blade. Such a construction permits relatively simple replacement of rotor blades when needed, and may further assist in reducing stress on the MRHA 801.

As further illustrated in FIG. 17 and explained below, the MRHA 801 (which includes the wheel 504b, an upper endcap 531, rotor blades 802a, 802, and other rotor components) may displace axially away from the body 502 of the vehicle 500 when the vehicle is in flight mode. As this axial separation occurs, the torsion springs 838 are configured to provide sufficient spring force to move the rotor blades 802a, 802b from their stowed position in the ground mode (e.g., lying against the body 502 as shown in FIG. 8), to a deployed position in the flight mode (as shown in FIGS. 9, 15, and 17).

Figure 20:
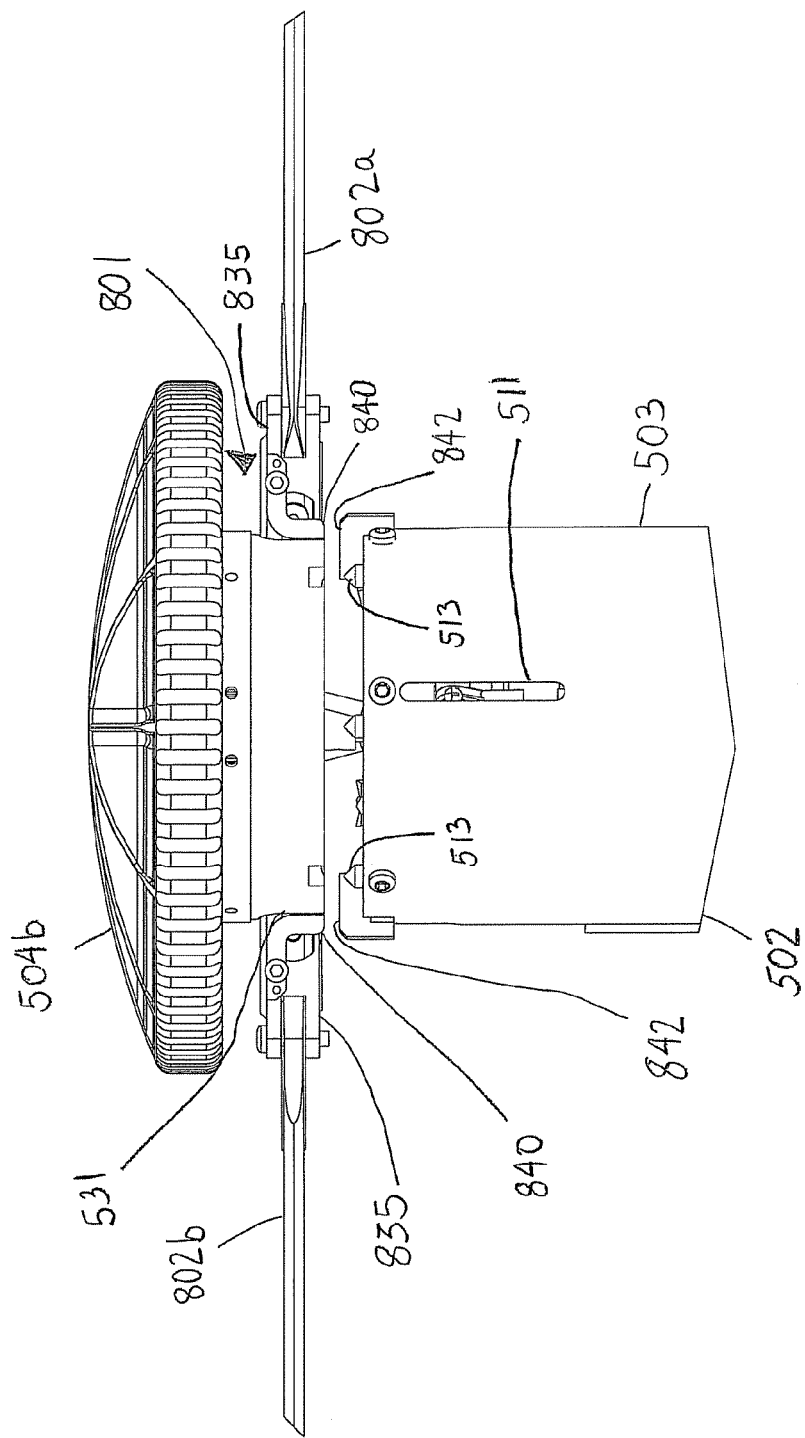
FIG. 20 is a side elevation view of the vehicle of FIG. 9 showing the MRHA of FIG. 17.

In order to return the rotor blades 802a, 802b to the stowed position, each rotor blade (e.g., each blade adapter 835) may include a first or rotor camming surface 840 as shown in FIGS. 19 and 20. The rotor camming surfaces 840 may be located on one or both sides of each rotor blade 802a, 802b and may, in the illustrated embodiment, fasten to the blade adapter 835 as shown.

Integrally formed with (or otherwise attached to) the upper chassis plate 512 of the body is a second or chassis camming surface 842 that interacts with the rotor camming surface 840 to effect movement (e.g., folding) of the rotor blades to the stowed position. Generally speaking, as the MRHA 801 is retracted towards the body 502 as explained below, the rotor camming surface 840 comes into contact with the chassis camming surface 842 and imparts a folding force (against the bias of the torsion spring 838) to force the blades 802a, 802b towards the body 502.

As further illustrated in FIG. 20, upper ends 513 of at least some of the elongate rods 508 may extend beyond the upper chassis plate 512 so that they may engage openings (not shown) formed in the upper endcap 531. Such engagement may occur as the MRHA 801 is retracted towards the body 502 from its second extended position in the flight mode. By providing a small clearance fit, the upper ends 513 may assist with aligning the MRHA 801 relative to the body 502. In one embodiment, the upper ends 513 may be conical as shown in FIG. 20 to assist with engagement with the openings formed in the upper endcap.

With continued reference to FIGS. 17 and 19-20, the pitch of the blades 802 may be controlled by the tie rods 832 (see FIG. 19). Each tie rod 832 may have its respective upper end attached to the lever arm 830 of its respective blade mount 828, while its lower end is connected to the swashplate 844. In the illustrated embodiment, the swashplate 844 is generally identical to that used in the Gaui Hurricane 200 V2 RC helicopter. However, other swashplates are certainly possible without departing from the scope of the invention. In the illustrated embodiment, the body covering 503 (see FIG. 20) may include a slot 511 to accommodate a protruding guide rod (not shown) of the swashplate 844. The slot 511 may allow axial movement of the guide rod while restricting rotation.

As shown in FIGS. 17 and 19, the swashplate 844 may also be connected to one or more servomotors 846. In the illustrated embodiment, three servomotors 846 are provided and connect independently to the swashplate 844 via three spherical rod end members 848 equally spaced-apart at 120 degree intervals as shown in FIG. 19. The servomotors 846 may be attached to a servo support plate 850 that is biased upwardly by one or more, e.g., three, compression springs 852. The springs 852 are compressed between the support plate 850 and snap rings 517 secured to grooves in some of the rods 508. In the illustrated embodiment, the support plate 850 and the rotor motor support plate 804 are interconnected such that the MRHA 801 (including the wheel 504b, upper endcap 531, and rotor blades 802a, 802b), rotor shaft 822, rotor motor 808, and servos 846/swashplate 844 together form a rotor sub-chassis 803 (see FIG. 17) that may move along and relative to the rods 508 of the body between a first and second position as described herein.

While various servomotor configurations are possible, the illustrated embodiment utilizes three model S3154 servomotors made by Futaba and distributed by Tower Hobbies of Champaign, Ill., USA. By using three separate servomotors to control the swashplate 844, collective/cyclic pitch mixing, a control protocol known for application in remote control helicopters, may be utilized to permit more responsive flight mode operation.

Figure 21:
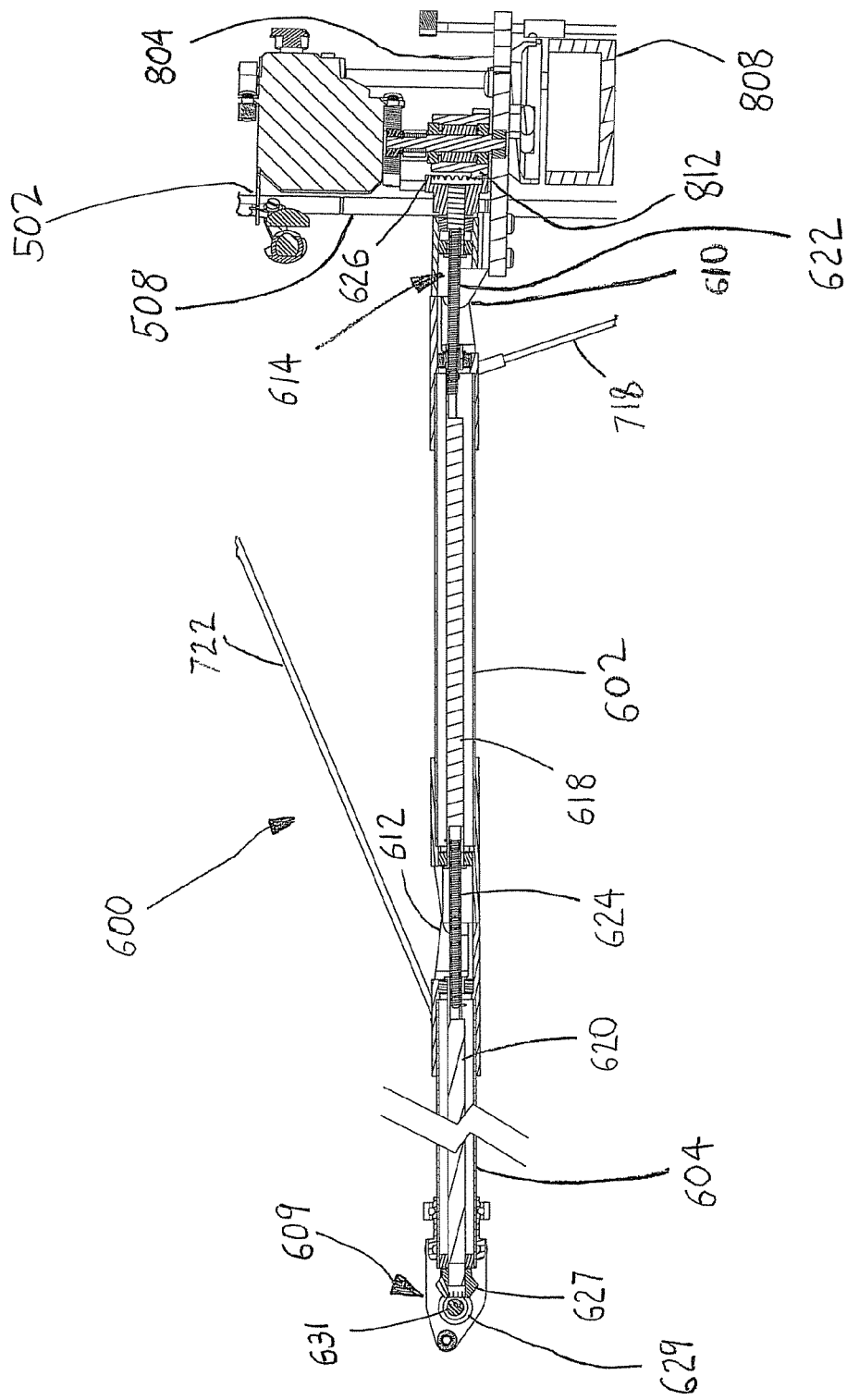
FIG. 21 is a partial section view of an exemplary tail assembly of the vehicle of FIG. 9 illustrating a tail rotor head assembly (TRHA) and tail rotor drive system in accordance with one embodiment of the invention.
Figure 22:
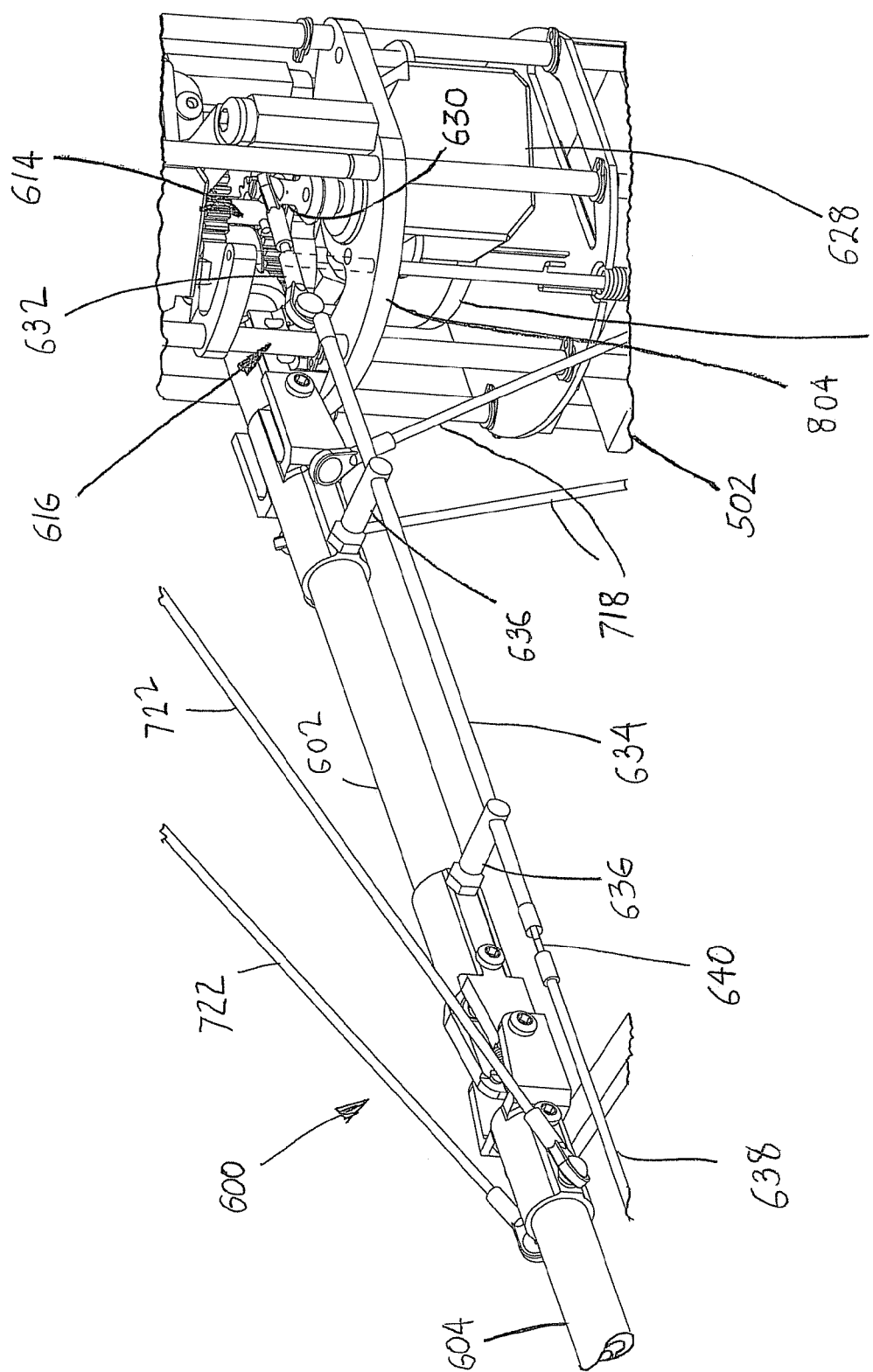
FIG. 22 is an enlarged partial perspective of the tail assembly of FIG. 21 illustrating the tail rotor drive system and an exemplary tail rotor pitch control system.
Figure 23:
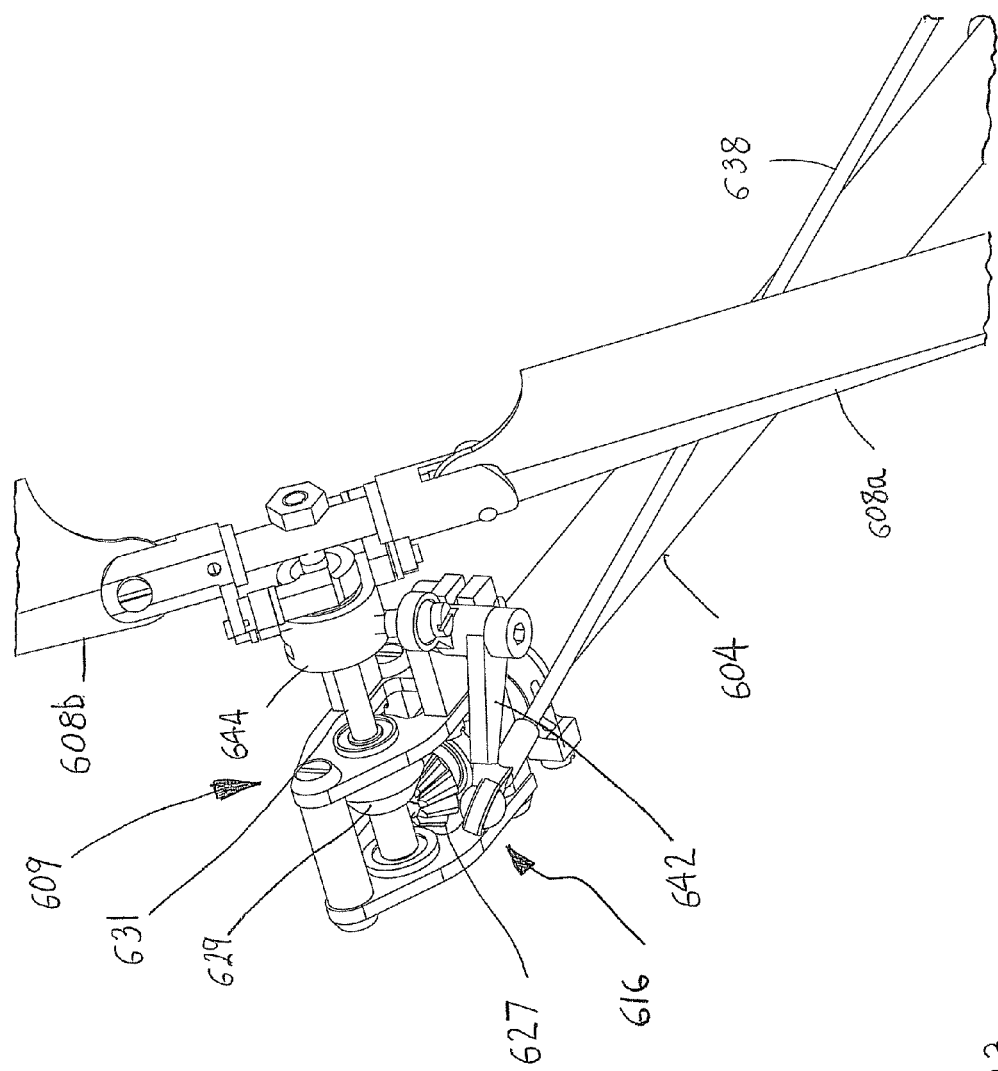
FIG. 23 is an enlarged perspective view of a TRHA in accordance with one embodiment of the invention.

In order to take flight, the vehicle 500 also provides power to the TRHA 609. While embodiments wherein the TRHA is powered by a separate motor are certainly possible, the rotor motor 808 may, in the illustrated embodiment, also power the TRHA 609. To illustrate an exemplary tail rotor drive system 614, as well as a tail rotor pitch control system 616, attention is now directed to FIGS. 21-23. FIG. 21 illustrates a cross section of the boom assembly 600 illustrating the rotor drive system 614, while FIGS. 22-23 illustrate the exemplary pitch control system 616.

As already described above, the first boom section 602 is pivotally connected to the body 502 at the body pivot 610, and to the second boom section 604 at the boom pivot 612. In the illustrated embodiment, the first and second boom sections 602, 604 each form hollow tubes operable to receive therein for relative rotation a first drive shaft 618 and a second drive shaft 620, respectively. To accommodate the movement of the boom sections about the pivots 610 and 612, flexible shafts 622 and 624 may be provided. In one embodiment, the flexible shafts may each be similar in construction to an elongated torsion spring. The first flexible shaft 622 may be attached to a crown gear 626 at a first end, and to the first drive shaft 618 at a second end. The second flexible shaft 624 may be attached to an opposite end of the first drive shaft 618 at a first end, and to the second drive shaft 620 at a second or proximal end as shown in FIG. 21.

The flexible shafts 622 and 624 are capable of transmitting torque from the crown gear 626 to the TRHA 609 during operation in flight mode (when the flexible shafts are generally aligned with the first and second drive shafts as shown in FIG. 21), yet are capable of bending to accommodate pivoting of the tail assembly 600 during operation in ground mode (see, e.g., FIG. 8). The flexible shafts 622 and 624 may also accommodate some misalignment between the boom sections and/or between the boom and the body 502. The drive shafts 618 and 620 and the flexible shafts 622 and 624 may mount relative to vehicle/boom structure with suitable bearings or bushings to permit the desired shaft rotation.

As further shown in FIG. 21, the crown gear 626 attached to the first end of the first flexible shaft 622 may mesh with the gear 812, which as described above, is driven by the rotor motor 808. Similarly, a distal end of the second drive shaft 620 may have attached thereto a bevel gear 627 (see also FIG. 23). The bevel gear 627 may mesh with a mating bevel gear 629 that is secured to a rotor drive shaft 631 to which the rotor blades 608a and 608b (see FIG. 23) are attached. As a result, whenever the rotor motor 808 is actuated, both the MRHA 801 and the TRHA 609 may be driven by the same gear 812.

FIG. 22 is an enlarged perspective view of the interface between the tail assembly 600 and the vehicle body 502. As shown in this view, the tail rotor pitch control system 616 may include a servomotor 628 (e.g., a Futaba model S3154) that may, like the rotor motor 808, attach to a lower side of the rotor motor support plate 804. The servomotor 628 may include a lever arm 630 having a spherical ended rod 632 connected to a first push-pull link 634. The first push-pull link 634 may extend along, e.g., parallel to, the first boom section 602 and be held in place by one or more supports 636 attached to the first boom section. The supports 636 may generally limit movement of the first push-pull link 634 to translation, e.g., to a direction parallel to the first boom section 602.

The first push-pull link 634 may be connected to a second push-pull link 638 via a pivot joint 640 or, alternatively, a flexible shaft. The distal end of the second push-pull link 638 may then connect to a lever arm 642 coupled to a swashplate 644 of the TRHA 609 as shown in FIG. 23. As a result, actuation of the servomotor 628 may effect changes in pitch of the rotor blades 608a, 608b. Such adjustments may adjust the thrust of the TRHA 609, which in turn, alters the counter-torque provided by the TRHA, e.g., controls rotation about a yaw axis.

To operate the vehicle 500 in ground mode, it may be configured as shown in FIGS. 8 and 13. As with the vehicle 100, the vehicle 500 may be propelled and steered by differential control of the speed of each wheel 504.

When needed or desired, the vehicle may be transformed to the flight mode via actuation of the transforming mechanism 700. For example, with the vehicle 500 in a generally horizontal position (e.g., both wheels 504 resting upon the reference or ground surface 101), the wheels 504 may be de-energized. With reference to FIG. 13, the vehicle may be given a command to extend the linear actuator 716. As the actuator 716 is energized, the actuator rod 717 extends from the actuator 716 as shown in FIG. 14. As the actuator rod 717 extends, it forces the slider plate 712 to also move upwardly. As the slider plate moves upwardly, it pulls the rods 708 upwardly as well. This upward motion of the rods 708 causes the lever arms 706 of the legs 702 to pivot about the pivot joints 704 (see also FIG. 9), forcing the legs 702 to move away from the body 502 as shown in FIG. 14.

The legs 702 may be configured to have a length sufficient to permit at least the two legs that initially contact the ground surface 101 to raise the upper end of the vehicle. That is, the two legs 702 that first contact the ground surface 101 may do so at a longitudinal location that is beyond (or "above" in FIGS. 13-15) the center of gravity of the vehicle. In this way, the legs are capable of upending the vehicle to the flight mode.

Extension of the actuator rod 717 also imparts a pushing force into the rods 718, forcing the first boom section 604 to pivot about the body pivot 610 (in the counterclockwise direction in FIG. 14). As this occurs, the first boom section 602 approaches an orientation that is generally orthogonal to the longitudinal axis 507 (see FIG. 15) of the vehicle 500. Moreover, the second boom section 604 (see FIG. 13) is also restricted in its motion by the rods 722. When the actuator 616 is fully extended, the tail assembly 600 may be deployed to the flight position illustrated in, for example, FIG. 9. As one can appreciate, the flexible shafts 622 and 624 may assist with deployment as they seek their undeflected positions.

In addition to deploying the legs 702 and the tail assembly 600, the transforming mechanism 700 may also permit movement of the MRHA 801 axially between the first position (corresponding to the ground mode), and the second position (corresponding to the flight mode). For example, when the vehicle 500 is in the ground mode, the springs 738 (see also FIG. 16) of the push/pull rod assembly 730 are substantially extended such that the lower rod 732 is withdrawn from the passageway 740 of the upper rod. As a result, the spring is stretched beyond its free length. As the rod 717 of the actuator 716 extends, it pushes the slider plate 712 upwardly, wherein the spring 738 begins to shorten. The springs 738 may assist in movement of the slider plate 712, and thus deployment of the legs 702.

Eventually, the second end 736 of the lower rod 732 may enter the passageway 740 of the upper rod 744 and bottom out therein. At this point, continued upper movement of the slider plate 712 results in direct upward movement of the upper rod 744.

Once the lower rod 732 contacts the upper rod 740, the tension of the spring 738 is isolated and no longer relevant to mechanism behavior. As a result, the rotor head support springs 852 (see, e.g., FIG. 17) may begin to extend towards their free length as permitted by the movement of the upper rod 740 and the attached rotor locking member 806. The springs 852 may assist with pushing the support plate 850, and thus the entire rotor sub-chassis (including the MRHA 801) upwardly. The biasing effect of the torsion springs 838 against the camming surfaces 840 and 842 (see FIG. 19) may further assist with rotor blade deployment.

Figure 24:
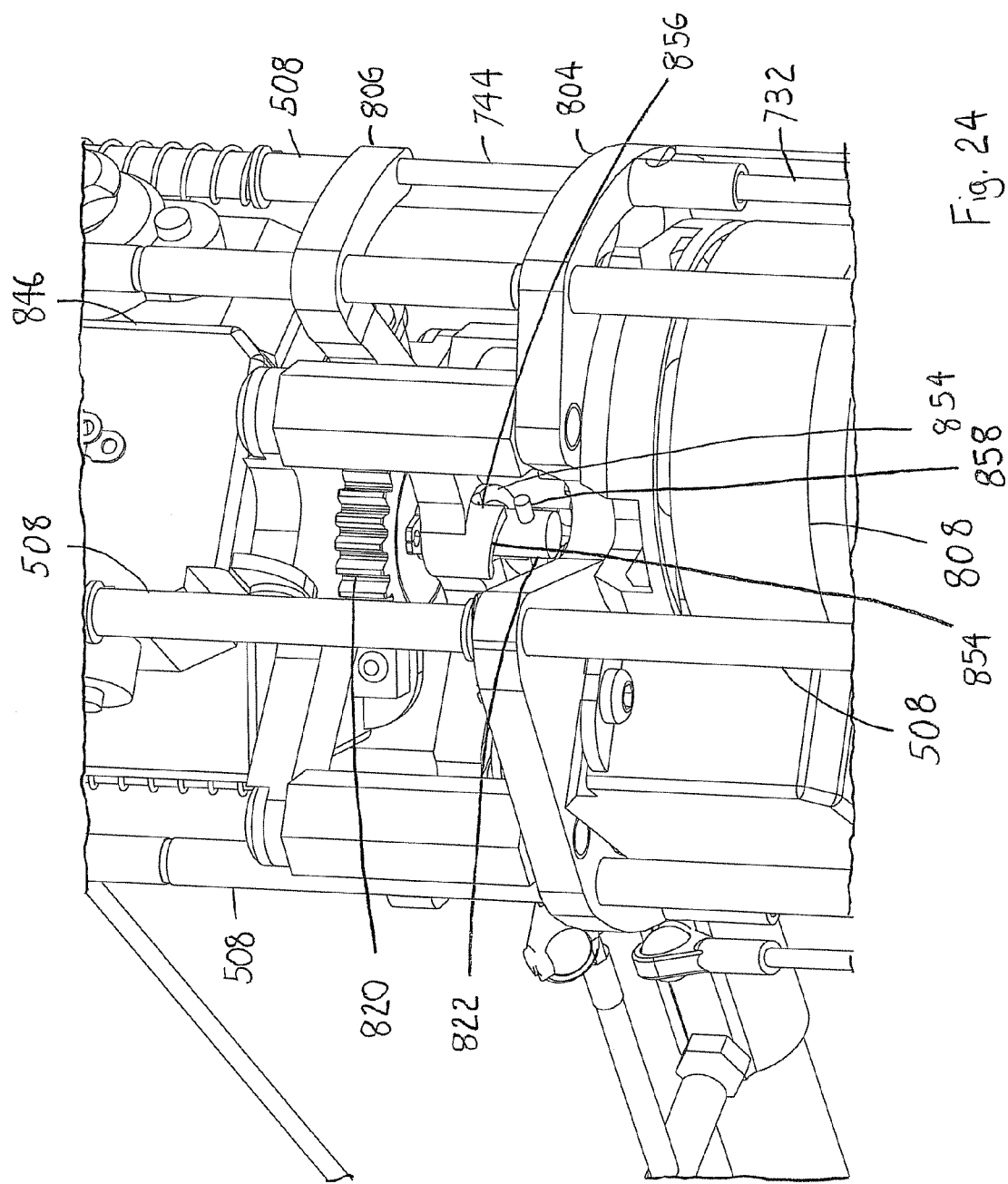
FIG. 24 is an enlarged perspective view of a portion of the lift rotor drive system illustrating a rotor locking member in accordance with one embodiment of the invention.

The rotor locking member 806 is shown in FIG. 24. In addition to locking the MRHA 801 from rotation during ground mode, the locking member 806 may also orient the rotor blades 802a, 802b to permit the MRHA 801 to be returned to the ground position. As shown in FIG. 24, the locking member 806 includes two helical cam surfaces 854 that surround the rotor shaft 822, each surface terminating at a stop surface 856. As the rod 744 moves upwardly, it forces the member 806 upwardly as well, allowing the MRHA to move upwardly. Once sufficiently displaced, the locking member 806 separates from and releases a rotor shaft pin 858, thereby freeing the rotor shaft 822 for rotation.

Once the rotor motor support plate 804 contacts the snap rings 516 as shown in FIG. 15, the MRHA 801 is fully deployed. At this point, the rotor motor 808 may be energized and the vehicle 500 flown to the desired target location. In one embodiment, a model SK720 "flybarless system" from Skookum Robotics, Ltd of Vacounver, BC, Canada, may be included to provide flight stabilization. In case of the latter, a digital switch, preferably controlled by a servo signal, may be provided to turn the flight electronics on and off. This may prevent the flight stabilization system from activating its flight feedback loop when the vehicle is in ground mode. Such an exemplary switch is the model 752 from Pololu Corp. of Las Vegas, Nev., USA. Moreover, a motor speed control system, such as a model Phoenix 25 from Castle Creations of Olathe, Kans., USA, may also be included.

Once the vehicle reaches the target location, it may land on the ground surface 101 and the MRHA 801 slowed to reduce lift. At this point, the rotation of the MRHA and TRHA may be stopped and the linear actuator 716 may be commanded to retract. As it retracts, the rod 744 (see FIG. 24) also retracts (e.g., moves downwardly, pulling the locking member 806 along with it. Continued downward displacement of the locking member 806 results in contact of the rotor shaft pin 858 with the cam surfaces 854. This will ultimately capture the rotor shaft pin 858 and guide it along the helical cam surfaces 854 until it rests against the stop surfaces 856, thereby immobilizing the rotor shaft 822. Once again, these stop surfaces 856 are oriented such that they stop the rotor shaft 822 such that the MRHA 801 is positioned in either one of two locations that align the motor portion 540 of the dog clutch 538 (see, e.g., FIG. 12) with one of the pinion portions 542. This clocking of the MRHA 801 may also ensure that the camming surfaces 840 and 842 may interact as described herein, and that blades 802a, 802b do not interfere with other aspects, e.g., sensors or tail assembly 600, of the vehicle 500 during ground mode operation.

Further retraction of the linear actuator 716 pulls the MRHA 801/sub-chassis 803 (e.g., via the pin 858) downwardly. Once again, the upper ends 513 (see, e.g., FIG. 20) of the rods 508 may engage openings of the endcap 531 to secure the MRHA 801 in place. Moreover, as the MRHA 801 is retracted, the camming surfaces 840 and 842 (described above with reference to FIGS. 19 and 20) force the rotor blades 802a, 802b to fold against the body 502 of the vehicle.

Movement of the linear actuator 716 may also cause the tail assembly 600 and the legs 702 to begin returning to their respective ground mode positions in a manner that is the reverse of that already described herein for their deployment. As the push/pull rod assembly 730 is retracted, the lower rod 732 and the upper rod 744 separate and lengthen the spring 738. The springs 738 may be carefully balanced against the other springs in the vehicle. Accordingly, they may utilize the stored energy resulting from actuator retraction to later assist with actuator extension as more actuator force is required for transforming from ground to flight modes. Such a configuration enables the use of a smaller actuator 716 that may otherwise be underpowered for the ground to flight mode transformation.

As the legs 702 lift from the ground surface, the robot may tip (due to the curved outer face of the lower wheel) until it returns to the ground mode. Once again, the center of gravity of the vehicle 500 may be such that it is inclined to tip in the desired direction. Alternatively, the configuration of the legs 702 may be such that it tips in the desired direction. Energizing the lower wheel could, in some embodiments, assist with tipping the vehicle as well.

The vehicle 500, as compared to the vehicle 100 of FIGS. 1-7B, enjoys the benefits of utilizing a different drive system for ground mode as compared to that used for flight mode. As a result, motors that are more suited to slower speed but higher torque may be used for ground mode, while a higher speed/lower torque motor may be used for flight mode. Moreover, longer main rotor blades 802a, 802b may be used without impacting the vehicle's overall length as the space needed for counter-rotating rotor separation is no longer an issue. Moreover, the vehicle 500 may provide more durability by enclosing the body and positively stowing the main rotor blades.

While not necessarily illustrated and/or described herein, robotic vehicles in accordance with embodiments of the present invention may incorporate ruggedized components, e.g., chassis, drive system, sensors, etc., such as described in U.S. Pat. No. 7,559,385 to Burt et al. As a result, the vehicle may survive under harsh operating conditions such as those experienced during landing (e.g., from tossing, dropping). Moreover, robots in accordance with embodiments of the present invention could be configured with work members, e.g., telescoping arms, that permit it to inspect and/or manipulate external objects to, for instance, inspect/work on elevated utility poles.

The complete disclosure of the patents, patent documents, and publications cited in the Background, the Detailed Description of Exemplary Embodiments, and elsewhere herein are incorporated by reference in their entirety as if each were individually incorporated.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein.

What is claimed is:

1. A robotic vehicle, comprising:
    a body;
    two wheels attached to the body, the wheels selectively rotatable, relative to the body, to propel the vehicle over a reference surface;
    a rotor head assembly attached to the body, the rotor head assembly selectively rotatable relative to the body about a rotor axis that is coaxial with a wheel axis about which each of the two wheels is configured to selectively rotate; and
    a transforming mechanism attached to the body and comprising two or more members operable to selectively contact the reference surface and reposition the body between: a ground mode, wherein the two wheels contact the reference surface; and a flight mode, wherein one or both of the two wheels are elevated above the reference surface.

2. The vehicle of claim 1, wherein the wheel axis is parallel to the reference surface when the vehicle is in the ground mode, and intersects the reference surface when the vehicle is in flight mode.

3. The vehicle of claim 2, wherein the wheel axis, when the vehicle is in the flight mode, is generally orthogonal to the wheel axis when the vehicle is in the ground mode.

4. The vehicle of claim 1, further comprising a rotor sub-chassis supporting the rotor head assembly, the sub-chassis movable relative to the body between a first position corresponding to the vehicle being in the ground mode, and a second position corresponding to the vehicle being in the flight mode.

5. The vehicle of claim 4, further comprising one or more springs operable to assist with moving the rotor sub-chassis between the first and second positions.

6. The vehicle of claim 1, further comprising a tail assembly extending outwardly from the body, wherein a distal end of the tail assembly comprises a tail rotor head assembly.

7. The vehicle of claim 6, wherein the tail assembly comprises two or more boom sections pivotally attached to one another, the two or more boom sections displaceable relative to one another by the transforming mechanism.

8. A robotic vehicle, comprising:
    an elongate body having a first end, an opposite second end, and a longitudinal axis extending therebetween;
    a powered, ground engaging wheel attached at or near each of the first and second ends of the body, the wheels selectively rotatable about the longitudinal axis of the body;
    a powered, main rotor head assembly attached to the body at or near the second end and selectively rotatable about the longitudinal axis of the body, the main rotor head assembly comprising at least one collapsible main rotor blade; and
    a transforming mechanism operable to reposition the vehicle between: a ground mode, wherein the longitudinal axis is parallel to a reference surface upon which the wheels rest; and a flight mode, wherein the longitudinal axis intersects the reference surface.

9. The vehicle of claim 8, further comprising a tail assembly, the tail assembly extending away from the body and comprising a tail rotor head assembly having one or more tail rotor blades.

10. The vehicle of claim 9, wherein the transforming mechanism is operatively coupled to the tail assembly and configured to reposition the tail assembly as the vehicle moves between the ground and flight modes.

11. The vehicle of claim 9, further comprising a rotor motor operatively attached to the body, the rotor motor coupled to both the main rotor head assembly and the tail rotor head assembly.

12. The vehicle of claim 9, wherein the tail assembly comprises:
    a first boom section comprising a first end pivotally attached to the body; and
    a second boom section comprising: a first end pivotally attached to a second end of the first boom section; and a second end supporting the tail rotor head assembly.

13. The vehicle of claim 8, wherein the collapsible main rotor blade extends along the body when the vehicle is in the ground mode, and extends away from the body when the vehicle is in the flight mode.

14. The vehicle of claim 8, wherein the transforming mechanism comprises two or more legs pivotally attached to the body at or near the first end.

15. The vehicle of claim 8, wherein the main rotor head assembly is attached to a rotor sub-chassis operable to move along the longitudinal axis of the body when the vehicle repositions between the ground mode and the flight mode.

16. The vehicle of claim 8, wherein the main rotor head assembly comprises a biasing member to bias the main rotor blade to a deployed position when the vehicle is in the flight mode.

17. The vehicle of claim 8, wherein the main rotor head assembly comprises a first camming surface and the body of the vehicle comprises a second camming surface that both contact one another to move the main rotor blade to a stowed position when the vehicle is transformed from the flight mode to the ground mode.

18. The vehicle of claim 8, wherein the transforming mechanism comprises a linear actuator having a rod displaceable in a direction parallel to the longitudinal axis of the body.

19. The vehicle of claim 8, further comprising a lift rotor locking member configured to selectively engage and rotationally immobilize a rotor drive shaft extending between the main rotor head assembly and a rotor motor.

20. A method of switching transport modes of a robotic vehicle, the method comprising:
    providing a vehicle comprising:
        an elongate body defining a longitudinal axis;
        two wheels each rotatably coupled to the body and each configured to rotate about the longitudinal axis;
        motors connected to the body, the motors operable to independently power the two wheels when the vehicle is in a ground mode; and
        a main rotor head assembly coupled to the body and configured to rotate about the longitudinal axis; and
    contacting a reference surface upon which the vehicle rests with legs of a transforming mechanism attached to the vehicle to reposition the vehicle from: the ground mode, wherein the two wheels are in contact with the reference surface; to a flight mode, wherein one or both of the two wheels are elevated above the reference surface.

21. The method of claim 20, further comprising energizing a rotor motor to rotate the main rotor head assembly.

* * * * *